US007730060B2

(12) United States Patent
Chakrabarti et al.

(10) Patent No.: US 7,730,060 B2
(45) Date of Patent: Jun. 1, 2010

(54) EFFICIENT EVALUATION OF OBJECT FINDER QUERIES

(75) Inventors: Kaushik Chakrabarti, Redmond, WA (US); Venkatesh Ganti, Redmond, WA (US); Dong Xin, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 264 days.

(21) Appl. No.: 11/423,303

(22) Filed: Jun. 9, 2006

(65) Prior Publication Data

US 2007/0288421 A1    Dec. 13, 2007

(51) Int. Cl.
*G06F 17/30* (2006.01)
(52) U.S. Cl. ...................... 707/723; 707/728
(58) Field of Classification Search .............. 707/3–7; 708/422–426
See application file for complete search history.

(56) References Cited

U.S. PATENT DOCUMENTS

| | | | |
|---|---|---|---|
| 5,535,382 A | 7/1996 | Ogawa | |
| 5,870,740 A * | 2/1999 | Rose et al. | 707/5 |
| 6,076,086 A | 6/2000 | Masuichi et al. | |
| 6,202,058 B1 | 3/2001 | Rose et al. | |
| 6,684,205 B1 | 1/2004 | Modha et al. | |
| 6,697,799 B1 * | 2/2004 | Neal et al. | 707/3 |
| 6,763,359 B2 * | 7/2004 | Lohman et al. | 707/102 |
| 6,766,316 B2 | 7/2004 | Caudill et al. | |
| 6,778,946 B1 * | 8/2004 | Chang et al. | 703/2 |
| 6,829,606 B2 * | 12/2004 | Ripley | 707/5 |
| 6,847,966 B1 * | 1/2005 | Sommer et al. | 707/5 |
| 6,862,586 B1 | 3/2005 | Kreulen et al. | |
| 6,871,201 B2 * | 3/2005 | Yu et al. | 707/7 |
| 7,158,970 B2 * | 1/2007 | Chang et al. | 707/5 |
| 7,171,408 B2 * | 1/2007 | Zuzarte | 707/5 |
| 7,185,012 B1 * | 2/2007 | Koudas et al. | 707/7 |
| 7,249,121 B1 * | 7/2007 | Bharat et al. | 707/3 |
| 7,281,002 B2 * | 10/2007 | Farrell | 707/3 |
| 7,415,461 B1 * | 8/2008 | Guha et al. | 707/5 |
| 2003/0158855 A1 | 8/2003 | Farnham et al. | |
| 2003/0220921 A1 * | 11/2003 | Fagin et al. | 707/7 |
| 2004/0260694 A1 * | 12/2004 | Chaudhuri et al. | 707/5 |
| 2005/0080774 A1 | 4/2005 | Janssen et al. | |
| 2005/0177805 A1 | 8/2005 | Lynch et al. | |
| 2005/0289102 A1 * | 12/2005 | Das et al. | 707/1 |
| 2006/0031219 A1 | 2/2006 | Chernyak et al. | |
| 2007/0106658 A1 * | 5/2007 | Ferrari et al. | 707/5 |
| 2007/0192306 A1 * | 8/2007 | Papakonstantinou et al. | 707/5 |

OTHER PUBLICATIONS

Bruno, Nicolas et al. "Evaluating Top k Queries over Web-Accessible Databases", Proceedings of the 18th International Conferences on Data Engineering, 2002, IEEE.*

(Continued)

*Primary Examiner*—Tim T. Vo
*Assistant Examiner*—Michelle Owyang
(74) *Attorney, Agent, or Firm*—Lee & Hayes, PLLC

(57) ABSTRACT

The subject disclosure pertains to a class of object finder queries that return the best target objects that match a set of given keywords. Mechanisms are provided that facilitate identification of target objects related to search objects that match a set of query keywords. Scoring mechanisms/functions are also disclosed that compute relevance scores of target objects. Further, efficient early termination techniques are provided to compute the top K target objects based on a scoring function.

14 Claims, 15 Drawing Sheets

OTHER PUBLICATIONS

Ilyas, Ihad F. et al. "Supporting Top-k join queries in a relational database", The VLDB Journal (2004) 13:207-221.*

Soumen Chakrabarti. Integrating the Document Object Model with Hyperlinks for Enhanced Topic Distillation and Information Extraction. WWW10, May 1-5, 2001, Hong Kong. http://www.mpi-sb.mpg.de/departments/d5/teaching/ws01_02/proseminarliteratur/chakrabarti-www01.pdf Last accessed Apr. 11, 2006.

Marti A. Hearst, et al. Reexamining the Cluster Hypothesis:Scatter/Gather on Retrieval Results. SIGIR'96, Zurich, Switzerland, 1996. Last accessed Apr. 11, 2006. http://delivery.acm.org/10.1145/250000/243216/p76-hearst.pdf? key1=243216& key2=8122374411& coll=GUIDE&dl=GUIDE& CFID=73437534& CFTOKEN=64581972.

Lin Guo, et al. XRANK: Ranked Keyword Search over XML Documents. Sigmond 2003, Jun. 9-12, 2003. San Diego, CA. Last accessed Apr. 11, 2006. http://patft1.uspto.gov/netacgi/nph-Parser?Sect1=PTO2&Sect2=HITOFF&p=1&u=%2Fnetahtml& r=1& f=G&I=50&d=PALL&S1=6684205.PN.&OS=PN/6684205& RS=PN/6684205.

Amit Sheth, et al. Relationships at the Heart of Semantic Web: Modeling, Discovering, and Exploiting Complex Semantic Relationships. Oct. 13, 2002. Last accessed Apr. 11, 2006. http://lsdis.cs.uga.edu/~kashyap/publications/relations.pdf.

Kemafor Anyanwu, et al. The p Operator: Discovering and Ranking Associations on the Semantic Web. http://www.sigmond.org/record/issues/0212/SPECIAL/7.Sheth.pdf Last accessed Apr. 11, 2006.

S. Agrawal, et al. DBExplorer: A System for Keyword Search over Relational Databases. In Proc. of ICDE, 2002. 12 pages.

S. Agrawal, et al. Automated Ranking of Database Query Results. In Proc. of CIDR, 2003. 12 pages.

R. Baeza_Yates, et al. Modern Information Retrieval, ACM Press, 1999. pp. i-77.

R. Baeza_Yates, et al. Modern Information Retrieval, ACM Press, 1999. pp. 78-185.

R. Baeza_Yates, et al. Modern Information Retrieval, ACM Press, 1999. pp. 186-259.

R. Baeza_Yates, et al. Modern Information Retrieval, ACM Press, 1999. pp. 260-355.

R. Baeza_Yates, et al. Modern Information Retrieval, ACM Press, 1999. pp. 356-431.

R. Baeza_Yates, et al. Modern Information Retrieval, ACM Press, 1999. pp. 432-513.

A. Balmin, et al. ObjectRank: Authority-Based Keyword Queries in Databases, In Proc. of VLDB, 2004. 12 pages.

G. Bhalotia, et al. Keyword Searching and Browsing in Databases using BANKS, In Proc. of ICDE, 2002. 10 pages.

S. Chaudhuri, et al. Evaluating Top-k Selection Queries, In Proc. of VLDB, 1999. 10 pages.

S. Chaudhuri, et al. Integrating DB and IR Technologies: What is the Sound of One Hand Clapping?, In Proc. of CIDR, 2005. 12 pages.

J. Conrad, et al. A System for Discovering Relationships by Feature Extraction from Text Databases, In Proc. of SIGIR, 1994. 11 pages.

S. Dessloch, et al. Integrating SQL Databases With Content-Specific Search Engines. In Proc. of VLDB, 1997. 9 pages.

R. Fagin, Combining Fuzzy Information From Multiple Systems. In Journal of Computer and System Sciences, 1999. 11 pages.

R. Fagin, et al. Optimal Aggregation Algorithms for Middleware, In Journal of Computer and System Sciences, 2003. 43 pages.

U. Guntzer, et al. Optimizing Multi-Feature Queries for Image Databases. In Proc. of VLDB, 2000. 10 pages.

V. Hristidis, et al. Discover: Keyword Search in Relational Databases, In Proc. of VLDB Conference, 2002. 12 pages.

I. Ilyas, et al. Supporting Top-k Join Queries in Relational Databases. In Proc. of VLDB, 2003. 16 pages.

D. Mattox, Expert Finder. MITRE Publications, 'The Edge', http://www.mitre.org/news/the_edge/june_98/third.html, Jun. 1998. 2 pgs. Last Accessed: Jun. 19, 2006.

S. Nepal, et al. Query Processing Issues in Image (Multimedia) Databases, In Proc. of ICDE, 1999. 8 pages.

Z. Nie, et al. "Object-Level Ranking: Bringing Order to Web Objects", In Proc. of WWW, 2005. 8 pages.

E. Voorhees, Introduction to Information Extraction and Message Understanding Conferences, http://www.itl.nist.gov/iaui/894.02/related_projects/muc/. 1 pg. Last Accessed: Jun. 19, 2006.

* cited by examiner

| DocId | DocScore |
|---|---|
| d1 | 1.0 |
| d3 | 0.6 |
| d4 | 0.2 |
| d6 | 0.2 |
| d2 | 0.1 |
| d5 | 0.1 |

(a) Complete Ranked List $L_1$ for kwd $w_1$

Retrieved this far during generation

| DocId | DocScore |
|---|---|
| d2 | 1.0 |
| d3 | 0.5 |
| d4 | 0.3 |
| d6 | 0.3 |
| d5 | 0.2 |
| d1 | 0.1 |

(b) Complete Ranked List $L_2$ for kwd $w_2$

| DocId | TOId |
|---|---|
| d1 | t1 |
| d1 | t2 |
| d2 | t1 |
| d3 | t3 |
| d3 | t4 |
| d4 | t3 |
| d4 | t5 |
| d5 | t4 |
| d5 | t5 |
| d6 | t2 |

(c) Complete Relationships Table R

Fig. 11a

| | numSeen[1] | aggScore[1] | ub[1] | numSeen[2] | aggScore[2] | ub[2] | lb | ub |
|---|---|---|---|---|---|---|---|---|
| t1 | 1 | 1.0 | 2.0 | 1 | 1.0 | 2.0 | 2.0 | 4.0 |
| t2 | 1 | 1.0 | 2.0 | 0 | 0 | 2.0 | 1.0 | 4.0 |

Fig. 11b

| | numSeen[1] | aggScore[1] | ub[1] | numSeen[2] | aggScore[2] | ub[2] | lb | ub |
|---|---|---|---|---|---|---|---|---|
| t1 | 1 | 1.0 | 1.2 | 1 | 1.0 | 1.3 | 2.0 | 2.5 |
| t3 | 2 | 0.8 | 0.8 | 2 | 0.8 | 0.8 | 1.6 | 1.6 |
| t4 | 1 | 0.6 | 0.8 | 1 | 0.5 | 0.8 | 1.1 | 1.6 |
| t2 | 1 | 1.0 | 1.2 | 0 | 0 | 0.6 | 1.0 | 1.8 |
| t5 | 1 | 0.2 | 0.4 | 1 | 0.3 | 0.6 | 0.5 | 1.0 |

Fig. 11c

EFFICIENT EVALUATION OF OBJECT FINDER QUERIES

BACKGROUND

To maximize likelihood of locating relevant information amongst an abundance of data, search engines or query processors are regularly employed. A search engine is a tool that facilitates data navigation based on entry of a query comprising one or more keywords. Upon receipt of a query, the engine or processor is operable to retrieve a list of objects or documents (e.g., text documents, websites, images, music, multimedia . . . ), typically ranked based on relevance to the query. Such mechanisms facilitate Internet/web search, user desktop search, and intranet/enterprise search, among other things. To enable this functionality, a supporting infrastructure is generated and maintained.

First, engine agents navigate domains in a methodical manner and retrieve information about objects visited. For example, an agent can make a copy of all or a portion of documents and related information. The engine then analyzes the content captured by one or more agents to determine how a document will be indexed. Some engines will index all words on in a document while others may in only index terms associated with particular tags such as such as title, header or metatag. These agents may also periodically revisit documents to detect and capture changes thereto since the last indexing.

Once the indexes are generated, they are assigned a ranking with respect to certain keywords and stored in a database. An algorithm is used to evaluate the index for relevancy, for example based on frequency and location keywords in a document, among other things. This database can subsequently be employed to evaluate queries.

Upon entry of one or more keywords as a search query, the search engine or query processor retrieves indexed information that matches the query from the database and displays the results to a user. The user can thereafter scroll through a plurality of returned documents to attempt to determine if the documents are related to the interests of the user as specified by a query. This can be a time-consuming process as search engines can return a substantial number of documents. A user may subsequently choose to narrow the search iteratively by altering and/or adding keywords and operators to obtain the identity of documents including relevant information.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject innovation relates to a class of queries and strategies for efficient execution thereof. More specifically, object finder queries are introduced. These queries return target objects related to search objects that best match query keywords by exploiting relationships between the target and search objects. The target objects can be anything as long as their relationships with search objects are available. In a product/review database, for example, a user may desire to search for product names (target objects) using keywords that are not necessarily contained within the product names but are present in reviews thereof (search objects). Matches can be obtained by searching the reviews and matching the identified reviews to product names based on relationships.

According to another aspect of the subject innovation, a scoring framework is disclosed. The framework enables scoring of target objects to facilitate ranking thereof, such as identifying the top K matches. Informally, the score of any target object can be computed in a myriad of ways by aggregating relevance scores associated with matching search objects. In one exemplary implementation, a score matrix can be constructed from a scoring component such as a full text search system. Target object scores can then be computed utilizing a row or column marginal class of scoring function to aggregate scores.

In accordance with yet another innovative aspect, efficient early termination techniques are disclosed to identify top K target objects. The techniques retrieve a small number of top search objects, obtain related target objects and determine upper and lower bound scores for the target objects seen so far. A generate only and generate prune approach can be employed to leverage these bounds to enable identification of the top K objects without analyzing all search objects matching query keywords.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 11$a$-$c$ depict exemplary ranked list and relationship tables.

DETAILED DESCRIPTION

In many document collections, documents are related to objects such as document authors, products described in the document or persons referred to in the document. In many applications, the goal is to find such related objects that best match a set of keywords. The keywords may not necessarily occur in the textual descriptions of target objects and may only occur in the documents themselves. In order to answer such queries, relationships between documents including keywords and the target objects related to those documents can be exploited.

Hereinafter, a class of queries referred to as object finder queries is introduced. The ultimate goal of such queries is to return the top K target objects that best match a given set of keywords by exploiting the relationships between documents, or more generally search objects, and target objects. A class of scoring functions is also provided to compute relevancy scores of target documents. Further, efficient early termination strategies are disclosed to compute the top K objects based on a scoring function within the aforementioned class. Finally, additional extensions to techniques and an exemplary operating environment are described.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
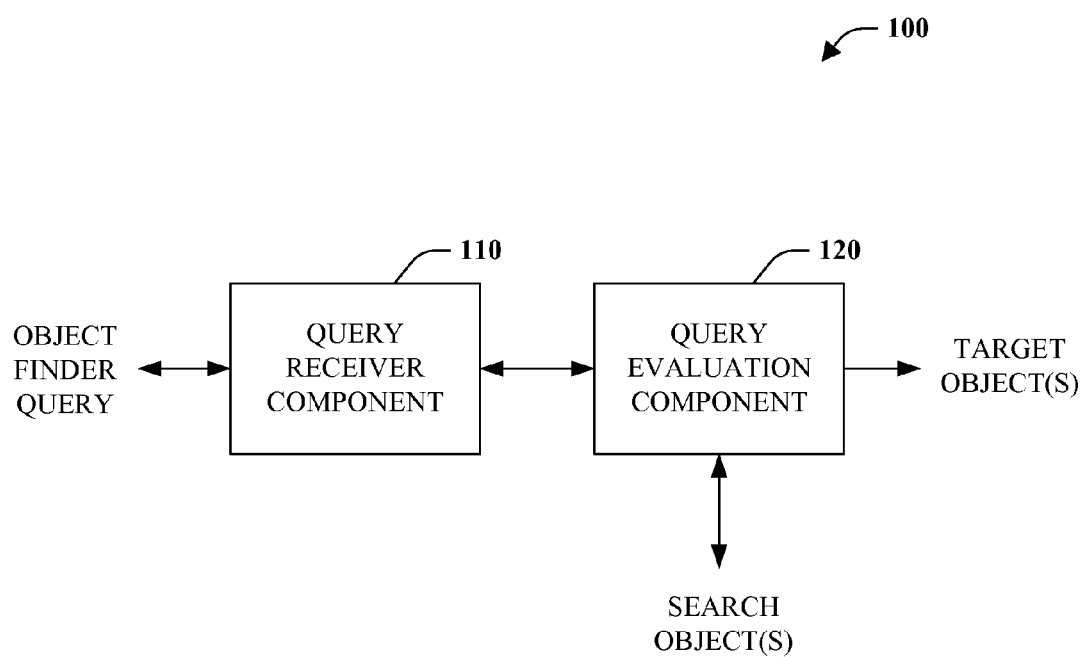
FIG. 1 is a block diagram of an object finder query processing system.

Referring initially to FIG. 1, a query processor system 100 is illustrated in accordance with an aspect of the subject innovation. System 100 processes a class of queries herein referred to as object finder (OF) queries. Object finder queries operate with respect to distinct class of objects and relationships between them. The objects include search and target objects. Search objects (SOs) are objects searched with respect to query keywords. Target objects (TOs) are objects desired as answers to a query. The relationships between the search and the target objects are represented by a set of <SO, TO> pairs. An object finder query specifies a request for target objects that match a given set of keywords.

The query processor system 100 includes a query receiver component 110 and a query evaluation component 120. The receiver component 110 is operable to receive, retrieve or otherwise obtain or acquire an object finder query. The evaluation component 120 is communicatively coupled to the receiver component 110 and can receive, retrieve or otherwise access an acquired object finder query. Further, the evaluation component 120 can evaluate the object finder query with respect to one or more search objects and return a set of matching target objects. This can be accomplished by exploiting relationship information between target and search objects. For example, a search object can include information associated with it such as attributes and or other extracted data. Relationship information can describe which information is associated with which search object. Accordingly, the search object can be queried with respect query keywords. Search object identities and associated scores can be employed along with relationship information to identify the most relevant target objects to return.

Figure 2:
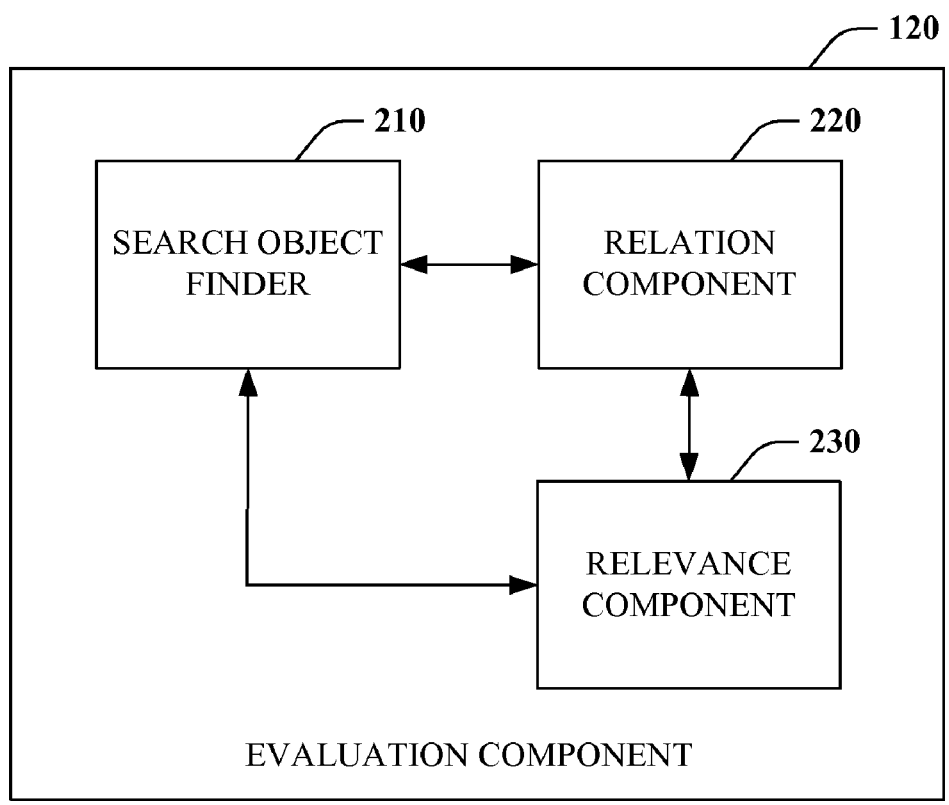
FIG. 2 is a block diagram of an object query evaluation component.

Turning attention to FIG. 2, the evaluation component 120 is depicted in further detail. The search object finder component 210 provides a mechanism for matching keywords and search objects. The search object finder component 210 can thus return a ranked list of search objects and related scores. In accordance with an aspect of the innovation, the search object finder component 210 can correspond to a full text search (FTS) system where the search objects are text documents. For example, the component 210 can index text content of documents at a preprocessing stage to support keyword queries on the documents at query time. Further, the search object finder component 210 can support an interface such that given a single keyword or a multi-keyword query, sorted access to the ranked list of documents matching the query can be provided. That is, the next best document can be retrieved from the ranked list along with the score. These document scores are referred to herein as DocScores. For clarity in description, the search object finder component 210 is assumed to index all documents by a single index, such as an FTS index. However, the techniques described herein are extendible to multiple indexes that index different sets of search objects.

Evaluation component 120 also includes a relation component 220 communicatively coupled to the search object finder component 210. The relation component 220 can identify target objects based search objects identified by the finder component 210. In accordance with an aspect of the subject innovation, target objects and relationships can be stored in distinct database tables. A target object table T can have a schema <TOId, TOValue> and store the ids and values of target objects. A relationship table R can have a schema <SOId, TOId> and store search-target object pairs that are related to each other. The relation component 220 can utilize these tables to identify target objects from given search objects.

Relevance component 230 can also be included within evaluation component 120. Component 230 is communicatively coupled to both the search object finder component 210 and the relation component 220 and aids in identifying the best target object matches. More specifically, relevance component 230 provides a mechanism that can discover the top K target objects. In accordance with an innovative aspect, the relevance component 230 can aggregate (multiple) ranked lists obtained from the search object finder component 210 and utilizing relation component information determine the most relevant target objects for a object finder keyword search. Further details regarding relevance component 230 and techniques implemented thereby will be provided infra.

Figure 3:
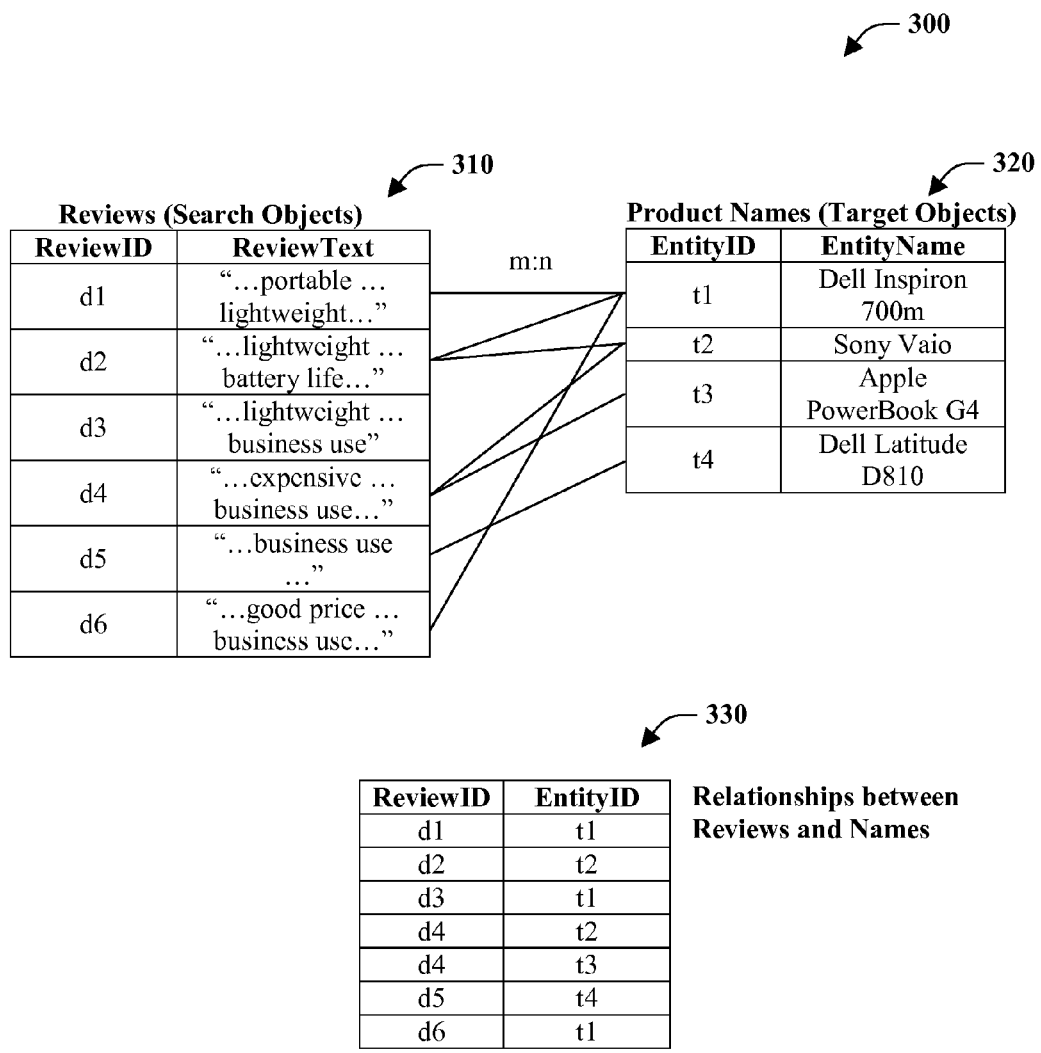
FIG. 3 illustrates a plurality of exemplary tables that can be employed to facilitate object finder query processing.

To facilitate clarity and understanding with respect to processing of object finder queries, consider the following non-limiting example in conjunction with FIG. 3. Consider a database of product reviews. Suppose, product names are extracted from the reviews by an entity extractor. The database now has two distinct classes of objects: reviews 310 with attributes ReviewId and ReviewText (and possibly other attributes) and product entities/names 320 with attributes EntityId and EntityName. The relationships between reviews and entities are represented by a set of <ReviewId, EntityId> pairs 330. A pair <d, t> is in that set if the review with id d is related to the entity with id t, which in this case means t has been extracted from d. An application might enable users to search for entities matching a set of keywords so that they may find products that best satisfy their desired criteria. As per FIG. 3, a user might search reviews/opinions to find laptops using the keywords "lightweight" and "business use." Note that these keywords do not occur in the names of laptops. Hence, current keyword search techniques cannot be used to answer such queries.

Such entity finder functionality can be employed to search for different object types (e.g., people, locations, companies, products, events . . . ) in a variety of domains. Herein, this functionality is abstracted out and formally defined in terms of a class of queries called object finder queries. Two important questions need to be addressed with respect to such queries. First, how does a target object match a set of keywords? Second, how is the relevance score of a target object computed to rank them? Consider the OF query with keywords "lightweight" and "business use" over the product review database 310. Intuitively, one would expect the entities "Dell Inspiron 700m" and "Sony Vaio" to qualify as answers since the reviews related to these entities contain the given keywords. Thus, reviews need to be found that include the keywords, using a full text search, for instance, and then relationships need to be exploited between reviews and entities to locate qualifying entities. The relevance of the entity can depend on how many reviews related to it include the query keywords and how well they match with those keywords. Thus, the relevance score of an entity can be an aggregate of the FTS scores (i.e., the keyword match scores returned by FTS) of all related reviews including the query keywords. For instance, the entity "Dell Inspiron 700m" in FIG. 3 is related to two reviews that contain the keyword "lightweight" (d1 and d3) and two reviews that contain the keyword "business use" (d3 and d6). Accordingly, the relevance score "Dell Inspiron 700m" for those keywords can be obtained by aggregating the FTS scores of the related documents. The subject query evaluation system could then return the K target objects with the best scores according to any chosen scoring function. Informally, the problem is to compute the top K target objects with the highest scores obtained by aggregating over one or more ranked lists.

Aggregation of (multiple) ranked lists of object scores prevents use of existing work such as the threshold algorithm (TA) family of algorithms. The threshold algorithm assumes that an object has a single score in each list. Here, a target object can have multiple document scores, which need to be aggregated, in each list (described further infra).

Most relational database management systems (DBMS) currently support FTS functionally. Hence, OF queries can be implemented in SQL. SQL evaluations performing aggregation over FTS scores would be forced to retrieve all the documents containing the set of query keywords, join them all with the relations table to find all related target objects, compute the aggregate scores of all these target objects, sort them all based on the score and return the top K to a user. For large document collections, FTS may return large numbers of documents causing this implementation to be very inefficient. The challenge is to exploit the property that only the top K target objects are required and terminate early.

Figure 4:
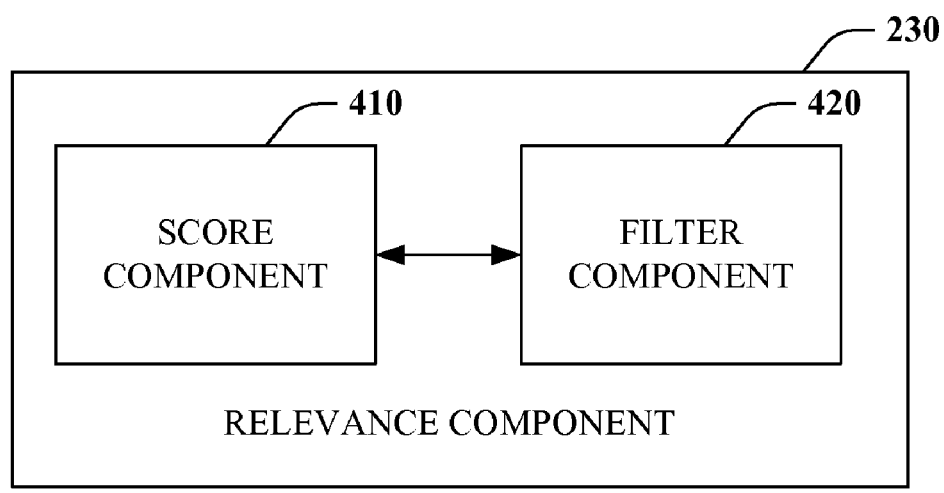
FIG. 4 is a block diagram of a relevance component for determining target object relevance.

Referring to FIG. 4, the relevance component 230 is illustrated in further detail in accordance with an aspect of the subject innovation. The relevance component 230 provides a mechanism to identify relevant target object with respect to an object finder query. The relevance component 230 includes a score component 410 and a filter component 420 communicatively coupled. In general, the score component 410 determines target object scores based at least in part on the scores of related search objects. The score component 410 functionality is based on the intuition that top scoring search objects typically contribute the most to the scores of high scoring target objects. Hence, the target objects related to these top scoring search objects are likely to be the best candidate matches. The filter component 420 interacts with the score component 410 to identify a specified number (e.g., K) of top matches. When these matches are identified, they can be returned in response to a query. In accordance with one particular implementation, search objects can be progressively retrieved in decreasing order of their scores and upper and lower bound scores computed and maintained for related target objects. Using these bounds, a superset of the top K target objects can be identified. Subsequently, in a second pruning phase a subset of these candidates are selected and their exact scores computed in order to isolate the top K target objects from them. The challenges of this approach are to compute tight bounds in the presence of aggregation over search object scores (e.g., FTS scores) and to minimize the number of target objects whose exact scores are computed in the pruning or filtering stage. A method that can be implemented by relevance component 230 is presented in a later section in further detail that can minimize the number of exact score computations.

The class of scoring functions that can be implemented by score component 410 are now described in accordance with an aspect of the innovation. The OF processing/evaluation system can return the K target objects with the best scores according to the scoring function chosen from this class.). For purposes of clarity and not limitation, these scoring functions will be described with respect to documents as search objects and DocScores related to the documents and provided by FTS (e.g., object search component) in the form of ranked lists. Informally, each function in this class computes the score of any target object by aggregating the DocScores of the documents related to it occurring in the ranked lists.

More formally, let $W=\{w_1, w_2, \ldots, w_n\}$ denote the set of Nkeywords in a OF query. Let $L_i$ denote the ranked list of document identifiers along with DocScores that would be returned by the FTS system for a single keyword query $\{w_i\}$. Let $D_t$ denote the list of documents related to t. The DocScores of the objects in $D_t$ in the above lists define a score matrix $M_t$ of t; a cell $M_t[i, j]$ contains the DocScores of the $i^{th}$ object in $D_t$ in list $L_j$; it contains 0 if the $i^{th}$ object in $D_t$ is not present in $L_j$. Let Score(t) denote the relevance score for the target object t (computed using $M_t$).

Figure 5:
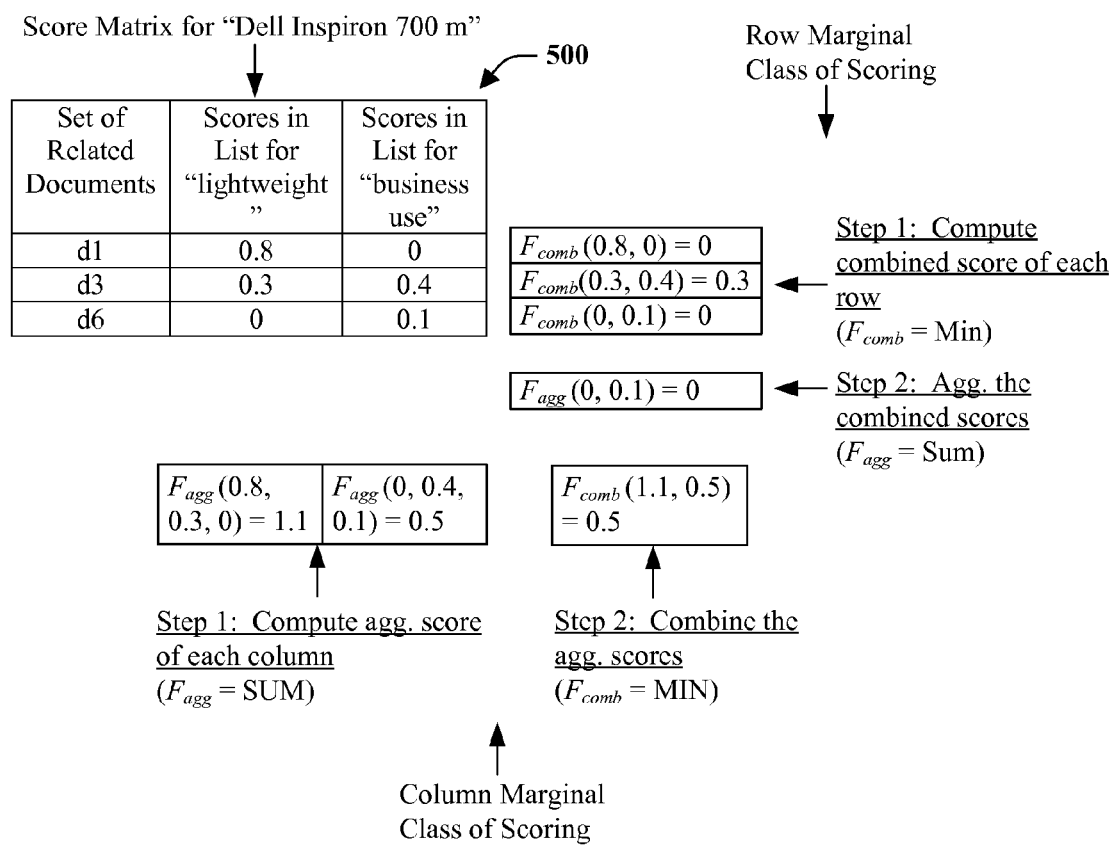
FIG. 5 illustrates exemplary classes of target object scoring.

Consider the keyword query {"lightweight", "business use"} previously presented with respect to FIG. 3. Suppose FTS returned ranked list $L_1=\{(d1, 0.8), (d2, 0.6), (d3, 0.3)\}$ for keyword "lightweight" and $L_2=\{(d5, 0.7), (d4, 0.5), (d3, 0.4), (d6, 0.1)\}$ for keyword "business use." Consider the target object "Dell Inspiron 700m"; $D_t=\{d1, d3, d6\}$. The score matrix of "Dell Inspiron 700m" for the above query is shown in FIG. 5 reference numeral 500.

A general scoring function would take the entire score matrix $M_t$ to compute Score(t). However, efficiently retrieving the best to K target objects according to any arbitrary function would be very hard without fetching all relevant documents and target objects. In light thereof, the following two classes of functions are presented. These functions first compute either the row marginals or the column marginals of the score matrix and then aggregate these marginals. The term "marginal" is used loosely in that the function for computing the row or column marginal may not be the sum function.

Turning first to the row marginal class, the overall score Score(t) of the target object t is computed in two steps. In step one, the scores in each row of the score matrix of t are combined using a combination function $F_{comb}$, i.e., for each document $d \in D_t$, its DocScores are combined in the N lists using $F_{comb}$ (The number of arguments of $F_{comb}$ is fixed once the number of key word queries issued against FTS is known, but the "arity" may vary across queries.) In the next step, the combined scores of all the documents in $D_t$ are combined using an aggregation function $F_{agg}$ to obtain the overall score. Formally, Score(t)=$F_{agg\ d \in Dt}$ ($F_{comb}$(DocScore(d, $L_1$), ..., DocScore(d, $L_n$n))), where DocScore(d, $L_j$) denotes the DocScore of the document $d \in D_t$ in list $L_j$(=0 if $d \notin L_j$). Applications can define a wide variety of scoring functions in this class by plugging in different $F_{comb}$ and $F_{agg}$; an example of such a scoring function with $F_{comb}$=MIN and $F_{agg}$=Sum applied to matrix 500 is illustrated in FIG. 5.

As per the column marginal class, Score(t) is also computed in two steps. First, the scores of each column of the score matrix t are aggregated employing an aggregation function $F_{agg}$. That is, for each list, the DocScores of all documents $D_t$ in that list are aggregated. In the second step, the aggregate scores of the N lists are combined utilizing a combination function $F_{comb}$ to obtain the overall score. Formally, Score(t)=$F_{comb}(F_{agg\ d \in Dt}$(DocScore(d, $L_1$)), ..., ($F_{agg\ d \in Dt}$ (DocScore(d, $L_N$)). Again, applications can define a wide variety of scoring functions in this class by plugging in different $F_{agg}$ and $F_{comb}$; an example of such scoring function with $F_{agg}$=SUM and $F_{comb}$=MIN applied to the score matrix 500 is shown in FIG. 5.

$F_{agg}$ and $F_{comb}$ may be required to include particular properties. More specifically, early termination techniques may only be applicable when $F_{agg}$ and $F_{comb}$ satisfy certain properties, such as but not limited to monotonicity. $F_{comb}$ is said to be monotonic if $F_{comb}(x_1, \ldots, x_n) \leq F_{comb}(y_1, \ldots, y_n)$ when $x_i \leq y_i$ for all i. It can be said that $F_{agg}$ is subset monotonic if $F_{agg}(S) \leq F_{agg}(S')$ if $S \subseteq S'$. This implies that, at any stage of aggregation, aggregating additional scores cannot decrease the aggregation score. Sum, count, max, sum_top_D and avg_top_D are examples of subset monotonic functions where sum_top_D (avg_top_D) denote sum (average) over the highest D scores in the set of scores being aggregated; note max is a special case of sum_top_D with D=1. Avg and min are not subset monotonic and hence $F_{agg}$ cannot be instantiated with avg. Note that the system can support avg_top_D, which emulates the properties of average. We say that $F_{agg}$ distributes over append if $F_{agg}(R_1$ append $R_2)=F_{agg}(F_{agg}(R_1), F_{agg}(R_2))$, where append denotes the ordered concatenation of lists of tuples. In the subject case, this property can be invoked over ordered (disjoint) fragments of ranked lists. The early termination techniques described infra can be applied if $F_{comb}$ is monotonic and $F_{agg}$ distributes over append and is subset monotonic.

Instantiations of scoring functions are now discussed in order to model certain semantic notions of matching for target objects. Provided are three exemplary instantiations: all query keywords present in each document, all query keywords present in a set of related documents and pseudo-document approach.

Consider the match behavior where it is said that a target object t matches with the keyword query W if and only if one or more documents related to t contains all the keywords in W; the higher the number of such documents related to it and the higher their scores, the better the match for t. This notion can be implemented by using the row marginal scoring framework by choosing an $F_{comb}$ that conserves the standard propositional semantics for conjunction like min while $F_{agg}$ can be a subset monotonic function like sum. An example for this choice of Fcomb and Fagg is shown in FIG. 5. "Dell Inspiron 700m" has a non-zero score because one of the documents related to it (d3) contains all the keywords and its final score depends only on the combined keyword score of d3.

The above notion of matching may be restrictive when there is no document related to t that contains all the keywords. For example, consider the target object "Sony VAIO" in FIG. 3. None of the documents related to it contain both the keywords "lightweight" and "business use." Therefore, it is not a match by the above notion. However, one review related to it contains "lightweight" and another includes "business use." Intuitively, it should match the query. To handle this, a more relaxed notion of match is considered as follows.

Consider the match behavior where it is said that t matches with W if and only if the documents related to it together cover all the keywords in W, i.e., each keyword in W is contained in at least one document related to t. The more the number of matching objects related to t for each keyword and the higher those individual keyword match scores, the better the match for t. Clearly, this definition would return "Sony VAIO" as a match in the example of FIG. 3. This definition can be implemented using the column marginal scoring framework by choosing a subset monotonic function like sum as $F_{agg}$ and min as $F_{comb}$. An example for this choice of $F_{comb}$ and $F_{agg}$ is shown in FIG. 5. "Dell Inspiron 700m" has a non-zero score because the set of objects related to it (d1, d3 and d6) covers both keywords. Note that this notion cannot be implemented using the row marginal framework.

Another instantiation is the pseudo-document approach. Consider the following simulation of facilitating keyword search over target objects. Suppose we associate with each target t object a pseudo-document created by concatenating all documents that t is related to. These pseudo-documents can then be indexed using FTS, for example, and directly facilitate keyword queries over them. Now, the ranked list of "documents" returned by FTS corresponds to a ranked list of target objects, which is the desired goal. However, the overall size of the pseudo-document collection is several times larger, because each document is replicated once per target object to which it is related. A scoring function can be instantiated within a class to simulate the same effect as the pseudo-document approach.

Most FTS scoring functions assigning relevance scores to documents have two components (i) a function $F_{score}$ which scores a document per query keyword, and (ii) a combination (using a function $F_{comb}$, say a liner combination based on IDF (Inverse Document Frequency) weights) of these scores across all keywords. TF-IDF (Term Frequency-IDF) scoring functions, commonly used in IR (Information Retrieval) systems, are examples of this type of scoring functions: Fscore is term frequency (TF) and $F_{comb}$ is a linear combination of document scores per keyword where the coefficients are determined by the IDF weights of the keywords. Suppose $F_{score}$ distributes over a concatenation of documents: $F_{score}$(d1 concat d2)=$F_{score}$(d1)+$F_{score}$(d2). The term frequency function is such an example. Under the conditions that $F_{score}$ is additive and $F_{comb}$ is fixed (i.e., it does not change with document collection), choosing a function within a column marginal framework where $F_{agg}$ is sum and $F_{comb}$ is the combination used by FTS would achieve the desired functionality.

The object finder problem can be defined as follows: Given a list $w_1, \ldots, w_N$ of query keywords, the scoring function $f$ in either the row marginal or the column marginal class, the interfaces for keyword queries over FTS and for random access on the relationships table R on both DocId and TOId, compute the K target objects with the highest score.

For the row marginal class of scoring functions, it is possible to perform the combination inside the FTS system, if FTS supports the desired combination function. For the match notion where all query keywords have to be present in each relevant document, a single combined keyword query $Q=(w_1$ AND $w_2$ AND ... AND $w_N$) can be submitted to FTS. The score Score(t) is then obtained by aggregating the DocScores of the documents related to t occurring in the single ranked list returned by FTS for the above AND query: Score (t)=$F_{agg\ d \in Dt}$ (DocScore $_{AND\ query}$(d)). The advantage here is that the combination over the keywords is performed by FTS and hence can be very efficient. Additionally, such a strategy may be possible for other types of combinations (e.g., disjunction) as well. In this case, the problem for the row marginal class is the same as that for the column marginal class except that there is a single combined keyword query, which returns a single ranked list of documents. For a general combination function that is not supported by FTS, a single ranked list corresponding to the combination query can be obtained as follows. Individual keyword queries can be issued to FTS and the ranked lists of documents can be combined to provide a single combined ranked list for aggregation. The problem again reduces to a column marginal class with a single combined keyword query.

It should be noted that commercial DBMSs now support FTS functionality by providing specialized user-defined functions (UDFs) to perform keyword search on text columns of database tables. Accordingly, OF queries can be implemented in SQL using these FTS UDFs.

Figure 6:
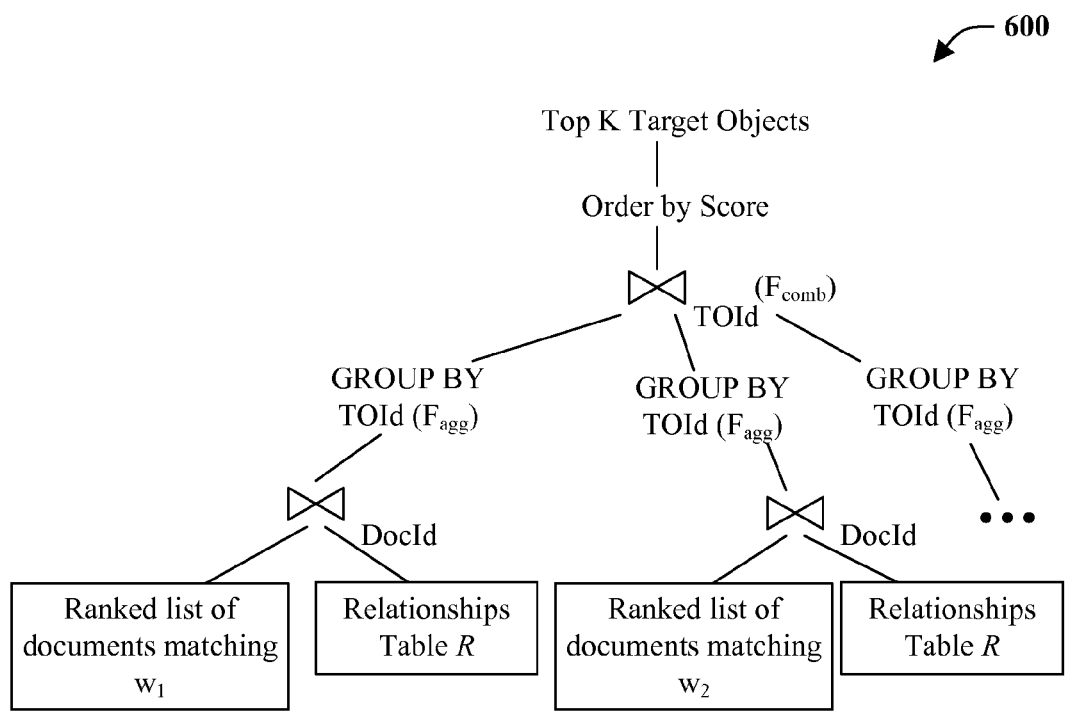
FIG. 6 depicts an exemplary SQL query plan for target object column marginal scoring.

FIG. 6 shows an execution plan 600 for the column marginal class. Each list is joined individually with the relationships table R on DocId to obtain the related target objects. Each join result can then be grouped by TOId and DocScores can be aggregated using $F_{agg}$. A full outer join can then be performed on TOId of the aggregation results and a combined score computed for each target object by combining its aggregate score from each list using $F_{comb}$. Finally, the TOIds are ordered by the combined scores and the top K TOIds returned. A clustered index on R.DocId may help the join with R to be efficient. Further, observe that algorithms such as TA may only be applied for the second join above the group by operators.

As discussed earlier, the presence of blocking operators (e.g., group by, order by . . . ) in the plan makes the evaluation somewhat wasteful. Since a user is typically interested in only top K target objects, costs can be significantly reduced by retrieving the top documents from the ranked lists progressively. Since progressive evaluation is not currently supported by SQL, it can be implemented utilizing middleware.

Figure 7:
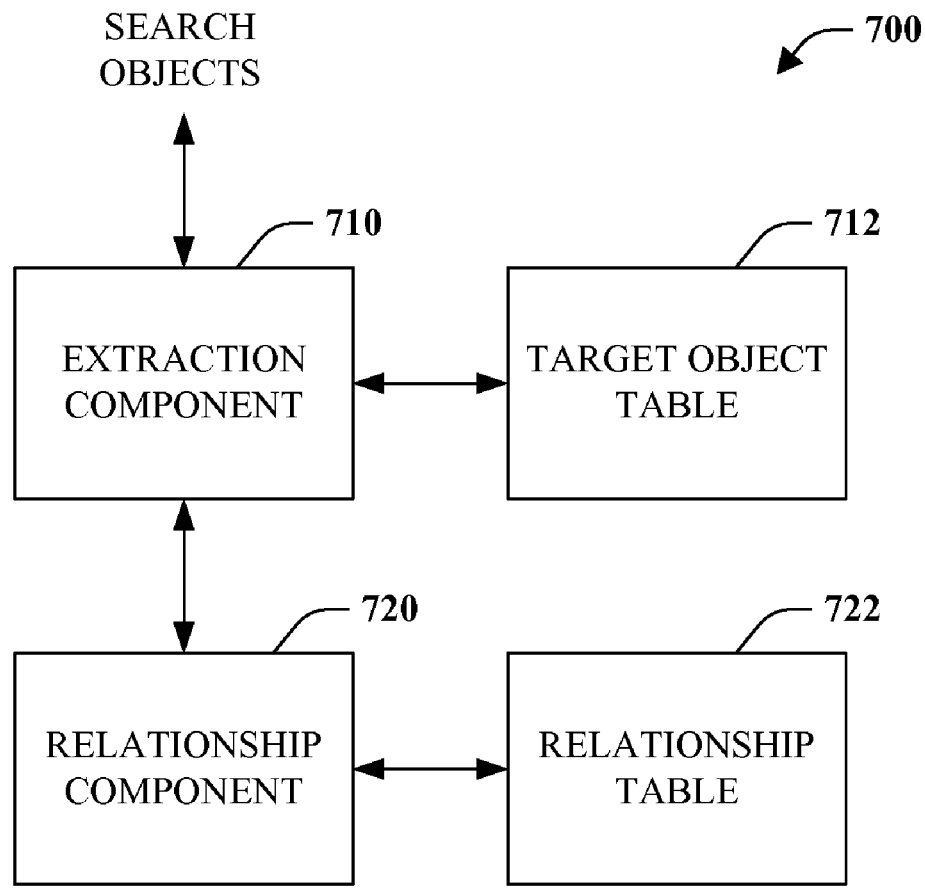
FIG. 7 is a block diagram of a preprocessing system.

Referring to FIG. 7, a preprocessing system 700 is illustrated in accordance with an aspect of the subject innovation. The system 700 includes an extraction component 710 and a relationship component 720. As mentioned previously, in accordance with one implementation the subject query processing system can employ a target object table 712 and a relationship table 722. System 700 facilitates generation of such structures for use in object finder query evaluation. The extraction component 710 receives or retrieves search objects and extracts structured information from the objects. For example, one or more of names of people, locations, organizations, products, events and the like can be extracted from documents. The extraction component 710 can concurrently, or subsequently, populate one or more target object tables 712 with the extracted information. For instance, the target object table 712 can include the names of products such as laptops as well as target object identifiers. The relationship component 720 can interact with the extraction component 710 to determine search objects that information is extracted from as well as the target id associated therewith. The relationship component 720 can generate a relationship table 722 that maps a search object to extracted target object information. In particular, the relationship table 722 can include records that identify a search object and the identifier associated with the extracted object. It should be appreciated that while two separate tables are generated/populated by the extraction component 710 and relationship component 720 a single table or structure may be employed by both to record information.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Figure 8:
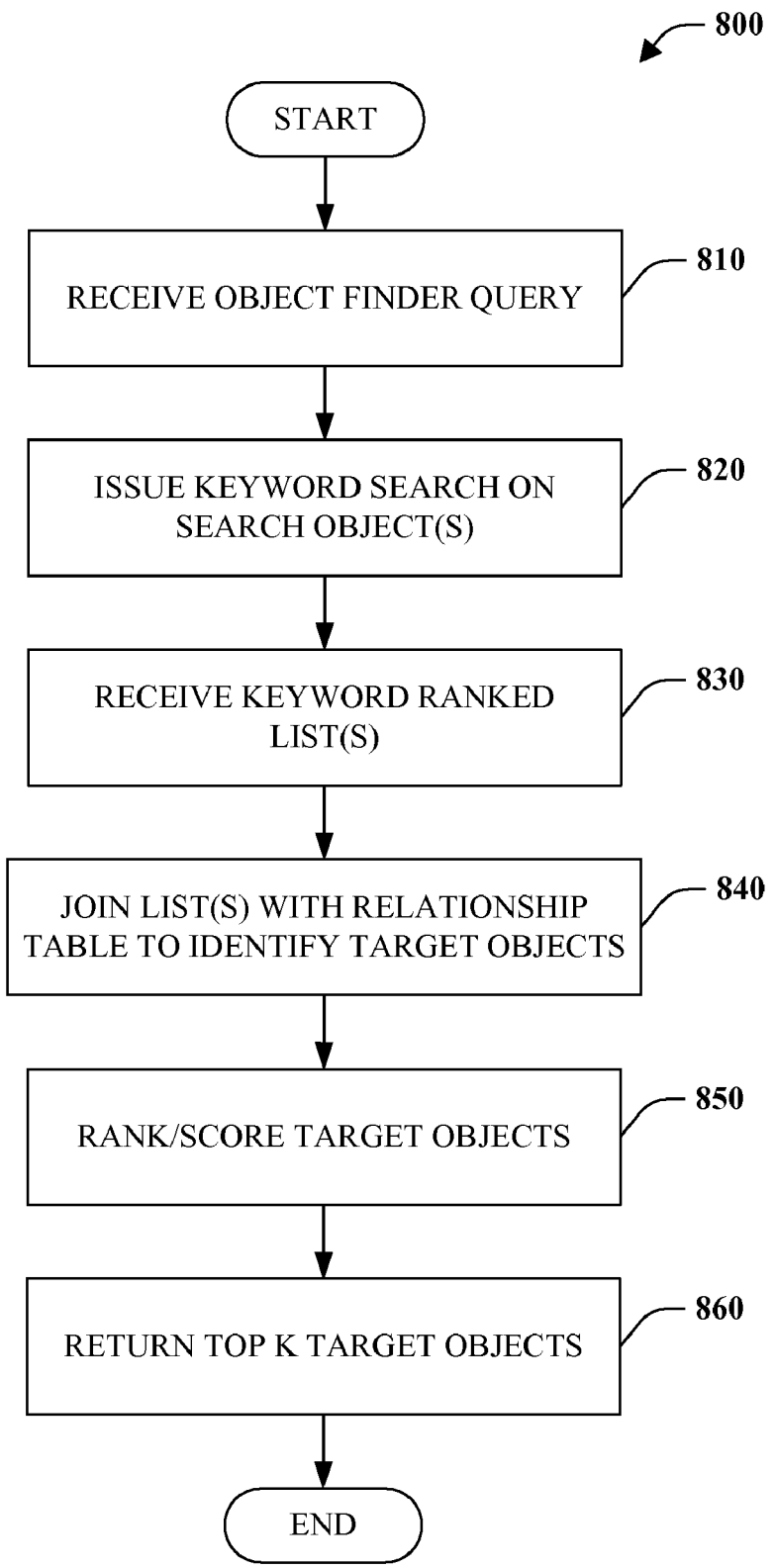
FIG. 8 is a flow chart diagram of a method of object finder query processing.
Figure 9:
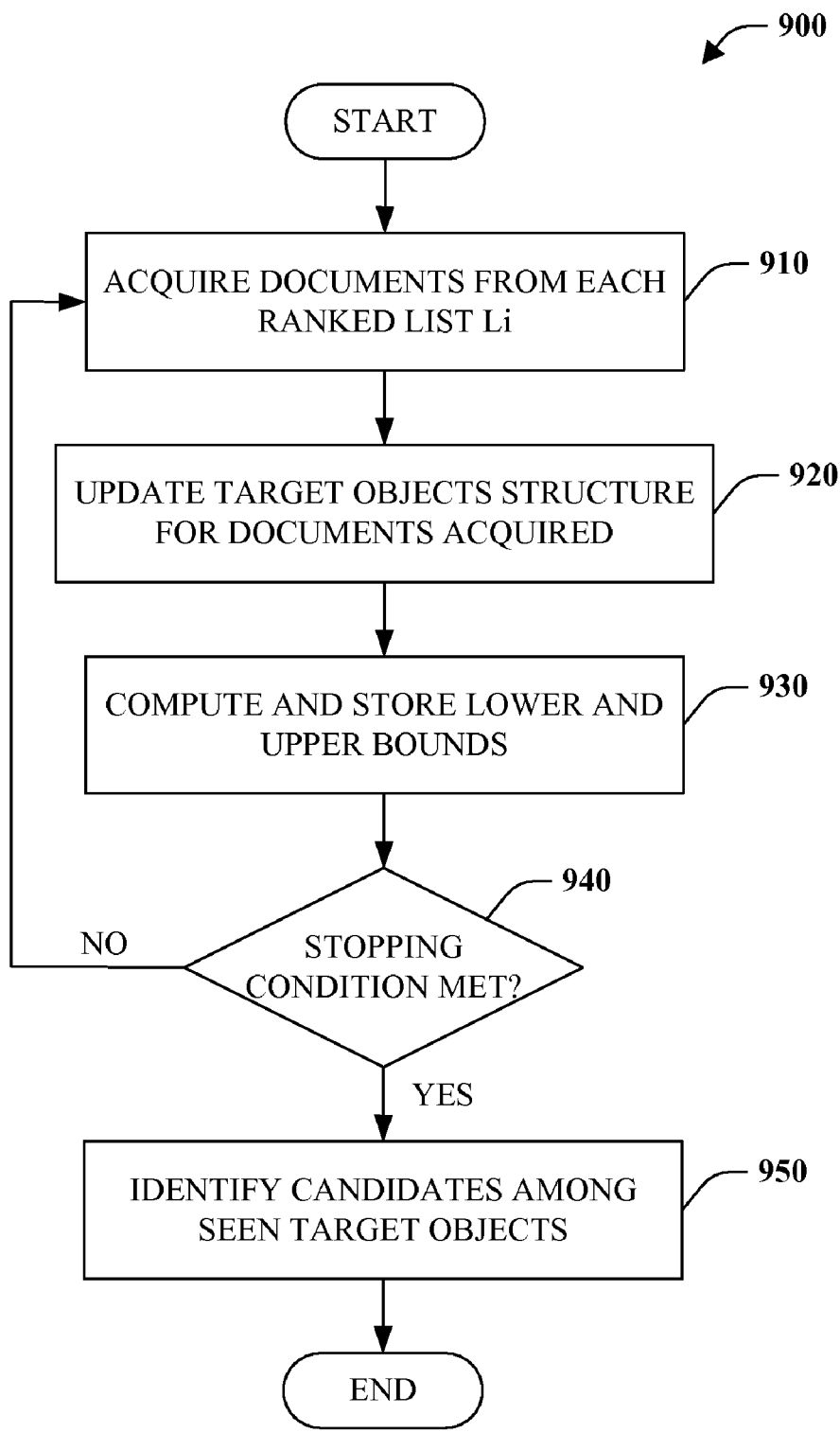
FIG. 9 is a flow chart diagram of a method for candidate generation associated with object finder query evaluation.
Figure 13:
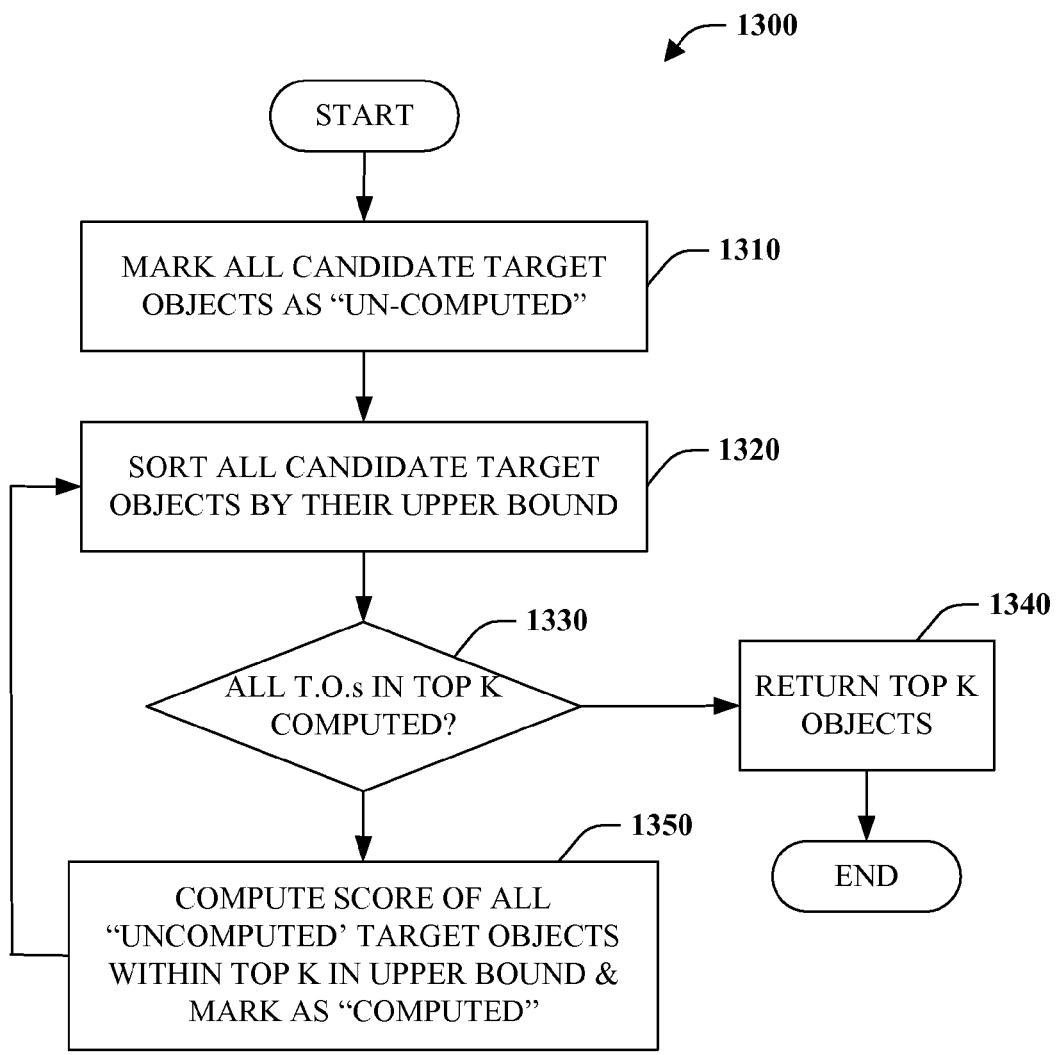
FIG. 13 is a flow chart diagram of a pruning algorithm.

In view of the exemplary systems described supra, methodologies that may be implemented in accordance with the disclosed subject matter will be better appreciated with reference to the flow charts of FIGS. 8, 9, and 13. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 8, a method 800 of object finder query processing is depicted in accordance with an aspect of the innovation. At reference numeral 810, an object finder query is received or otherwise obtained. An object finder query provides a request for relevant target objects that best match a set of query keywords. However, the keywords may not necessarily occur in the textual description of target objects; they can occur only in related search objects. Thus, the goal is to return target objects that best match a set of one or more keywords by exploiting relationships between search objects and target object. At numeral 820, a keyword(s) search is issued on one or more search objects. For instance, if the search object is a text document, a full text search can be full over the document. At 830, one or more lists of ranked search objects are received based on the relevancy of keyword matches. At numeral 840, target objects associated with ranked list search objects are identified, for example by joining the list with a relationship table or like structure. The identified target objects are scored or ranked at 850. At reference numeral 860, the top K target objects are returned in response to the received object finder query. The exact number of K can be a default value or it can vary. For instance, the number of top results desired can be specified within the query itself.

What follows is a description of innovated approaches for OF query evaluation. At a high level, the idea is to retrieve a small number of top search objects from each ranked list, get the related target objects by looking up the relationships and determine upper and lower bound scores for those target objects "seen" so far. Often these bounds can guide methods and enable early termination. Two main approaches for leveraging these bounds to stop early are presented infra, namely generate-only and generate-prune.

The generate-only approach relies on the bounds and stops when it can determine that it has identified the best K target objects based on a stopping condition. The method is halted if the condition is met; otherwise, more search objects are fetched and analyzed.

The generate-prune approach has two phases: a candidate generation phase followed by a pruning phase. During the generation phase, upper and lower bounds are used to identify a superset of the top K objects. The stopping condition to check that a superset has been identified is more relaxed than that of the generate-only approach. This approach retrieves fewer search objects from the ranked lists and does fewer relational lookups (e.g., relationship table). During the pruning phase, the subset of the best K target objects is isolated.

The method for the generate-only approach is the same as the method for the generation phase of the generate-prune approach except for the stopping condition. Therefore, the generate-prune approach will be described first and then the stopping condition for the generate-only approach will be discussed.

The goal of the candidate generation phase is to generate a superset of the top K target objects. Keyword queries one for each keyword $w_i$ are submitted, for example to FTS, and a ranked lists $L_1, \ldots, L_N$ of documents or search objects are obtained. These lists can be processed iteratively. In each iteration, more documents from the ranked list $L_i$ are retrieved and the query is evaluated over the prefixes, denoted by Prefix $(L_i)$, of documents retrieved so far from the $L_i$s. Evaluation of the query generates and/or populates a SeenTOs (Seen Target Objects) table or like structure that includes the current aggregation scores as well as the lower and upper bound scores of all target objects related to one or more documents in any Prefix$(L_i)$. Utilizing the SeenTOs table, a check can be made as to whether further retrieval from ranked lists can be halted. If so, candidates from the SeenTOs table can be identified, otherwise, more documents can be retrieved from each $L_i$ and the above process can iterate again.

A straightforward approach is to generate the SeenTOs table from scratch every time. That is, re-evaluate the query over the entire prefixes in every iteration. However, this is wasteful. Instead, the distributive properties of both $F_{agg}$ and the join operator can be exploited to evaluate the query incrementally, i.e., in each iteration process just the newly retrieved documents and update the scores in the SeenTOs table.

Referring to FIG. 9, a candidate generation method 900 is illustrated in accordance with an aspect of the subject innovation. For further clarity and understanding, consider also example 1000 of FIG. 10 in conjunction with the following description. Example 1000 illustrates specifics of how a query is evaluated over the prefixes Prefix$(L_i)$ in each iteration.

At reference numeral 910, search objects or documents are acquired from each ranked list $L_i$. In each iteration, the next chunk $C_i$ of documents are retrieved from each $L_i$. The documents can be received in chunks or blocks in order to reduce the number of join queries (with R) issued to a DBMS, for instance. The choice of chunk size presents a tradeoff between the number of "unnecessary" documents (i.e., not necessary to generate candidates) retrieved from FTS and the number of join queries issued.

At 920, the target objects structure is updated for acquired documents. The new chunks retrieved in the current iteration can be processed incrementally and the Seen TOs table updated with processed values. This has two main parts incrementally computing the Group By and the combination.

Figure 10:
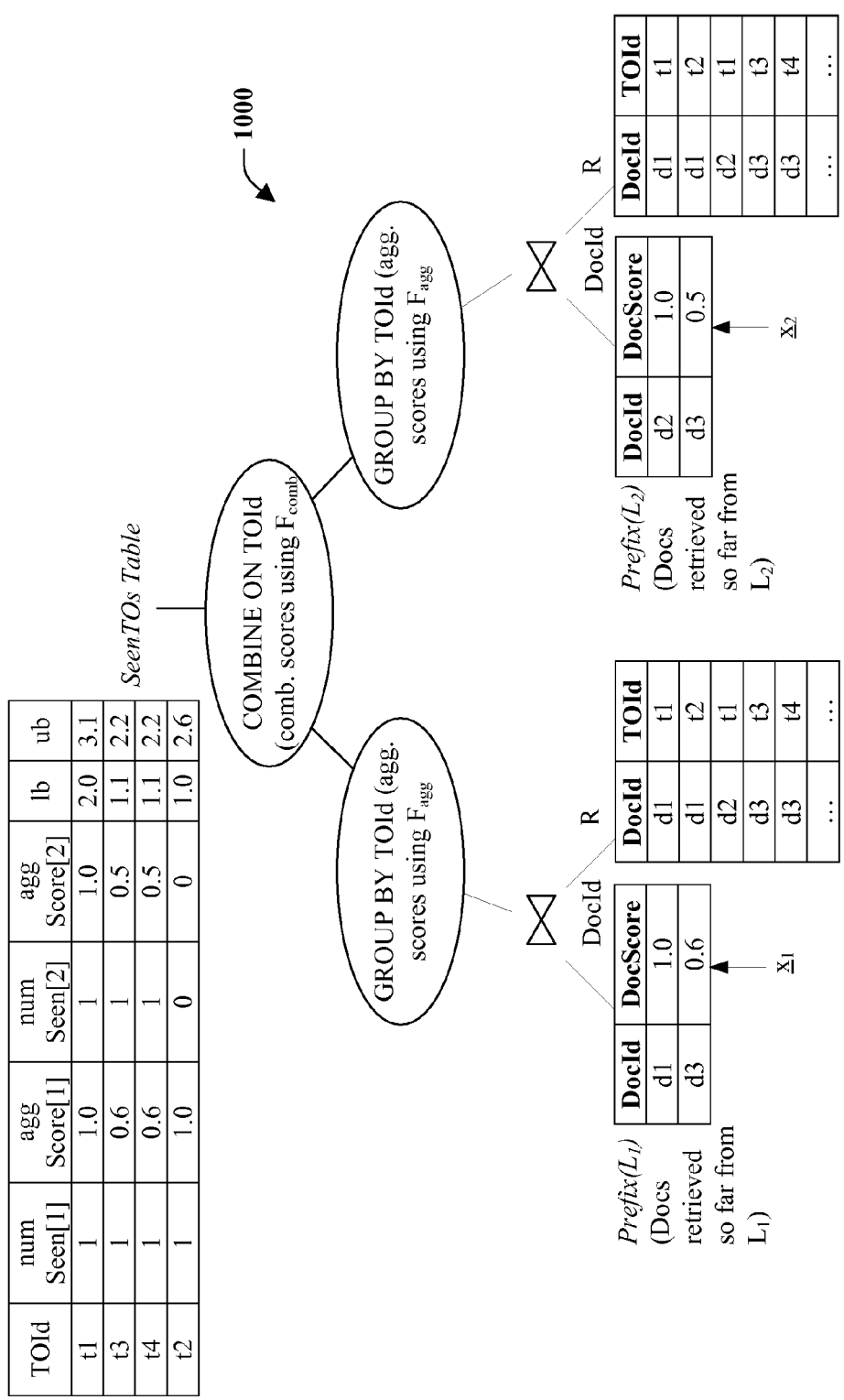
FIG. 10 illustrates exemplary candidate generation structures to facilitate clarity with respect to FIG. 9.

As per FIG. 10, the Group By is computed for each list $L_i$. For each Li, a system can maintain across iterations, an AggResult$_i$ table (not shown) including the following information for each target object t related to one or more documents in the Prefix$(L_i)$: the number numSeen of documents in Prefix(Li) related to t and the "current" aggregate score aggScore, i.e., the aggregate of DocScores of the documents in Prefix(Li) related to t. The aggScore column in AggResult$_i$ can be computed incrementally. The numSeen column is computed in a similar fashion.

Formally, the aggscores in AggResult$_i$ at the end of any iteration is GroupBy$_{TOId}$(Prefix$(L_i) \bowtie_{DocId}$ R, $F_{agg}$(DocScore)) where GroupBy A (S, F(B)) denotes Group By over relation S on column A and aggregation on column B using aggregate function F. AggResult$_i$ is empty at the start of the first iteration. The new prefix after this iteration is (Prefix$(L_i)$) append $C_i$), so the new AggResult$_i$ after this iteration should be: GroupBy$_{TOId}$((Prefix$(L_i)$ append $C_i) \bowtie_{DocId}$ R, $F_{agg}$(DocScore)). Since both join and Fagg distribute over append, the new aggScores can be obtained from GroupBy$_{TOId}$(Prefix $(L_i) \bowtie_{DocId}$ R, $F_{agg}$(DocScore)) (the AggResult$_i$ from the previous iteration) and GroupBy$_{TOId}$($C_i \bowtie_{DocId}$ R, $F_{agg}$(DocScore)) (the aggresult for the current chunk). The AggResult for the current chunk $C_i$ is first computed by joining it with R and then aggregating on the join result using $F_{agg}$. The AggResult is then merged for the current chunk into the AggResult$_i$ table as follows: For each t in the AggResult for the current chunk, if t is already present in the AggResult$_i$ of the previous iteration, the t.aggScore is updated to $F_{agg}$(previous t.aggScore, t.aggScore for the current chunk). Otherwise, t is inserted into AggResult$_i$ setting t.aggScore to be that in the current chunk.

To update AggResult$_i$ efficiently, it can be maintained as a hash table keyed on TOId. Therefore, in each iteration, the join and the Group By are evaluated over the newly retrieved chunks only.

The combined Seen TOs table is a full outer join on TOId of the AggResult$_i$ tables defined above. Since the AggResult$_i$ can be in-memory hash tables, the outer join can be performed simultaneously with the aggregation by maintaining a unified SeenTOs hash table and updating the SeenTOs table directly instead of maintaining separate AggResult$_i$ tables. The SeenTOs table contains any target object t present in any of the AggResult$_i$ tables and all the columns in AggResult$_i$ tables, i. e., it contains t's numSeen and aggScore values for each $L_i$. These columns can be denoted as numSeen[i] and aggScore[i], respectively. If a target object t SeenTOs is not present in AggResult$_i$, t.numSeen[i] and t.aggScore[i] are set to zero. To efficiently update the lower and upper bound scores of target objects in SeenTOs in each iteration, SeenTOs can be maintained as a hash table keyed on TOId.

Returning attention back to FIG. 9, at reference numeral 930, upper and lower bounds are computed and stored. In this act, the SeenTOs table previously generated/populated is employed to compute the lower and upper bound scores of each target object t in SeenTOs (stored in two separate columns in the table). Here, the subset monotonicity property of $F_{agg}$ and $F_{comb}$ is exploited. First, consider the lower bound. Since, $F_{agg}$ is subset monotonic, the "current" aggregate score t.aggScore[i] of t for Li is the lower bound of t for $L_i$. The combined lower bound score of t, denoted by t.lb is the combination of the individual lower bound scores t.aggScore [i]. That is, t.lb=$F_{comb}$(t.aggScore[1], . . . , t.aggScore[N]). In FIG. 10, the lower bound for t1=2.0 as the $F_{comb}$=Sum. More specifically, t1.lb=Sum(1.0, 1.0)=2.0.

The computation of the upper bound scores depends on a constant B called the cardinality bound. B is the maximum number of documents in any ranked list $L_i$ that can contribute to the score of any target object t. For clarity in discussion assume B is known. Its computation will be discussed in detail later. Since there are t.numseen[i] documents related to t in Prefix($L_i$), there can be at most (B−t.numseen[i]) documents in ($L_i$−Prefix(Li)) that can contribute to the aggregate score of t for $L_i$. Furthermore, the DocScores of such unseen documents is upper bounded by the DocScore $x_i$ of the last document retrieved from $L_i$, as shown in FIG. 10. The upper bound score of t for list $L_i$, denoted by t.ub[i], is therefore aggregation of the current aggregate score (i.e., t.aggScore[i]) and the upper bound of the remaining contribution: t.ub[i]= $F_{agg}$(t.aggScore[i], $F_{agg}$($x_i$, $x_i$ . . . , (B−t.numseen[i]) times)). The combined upper bound score, denoted by t.ub, is: t.ub=$F_{comb}$(t.ub[1], . . . , t.ub[N]).

As per the upper bound in FIG. 10, consider t1 once again. Here, B=2, thus any target objects can be related to at most two documents in any of these rank lists. If that is true, we know the current aggregate score for t1 is 2.0 and there can be at most one more document that can contribute to the score of t1, because it cannot be more than two and it was already seen once. It is also known that any score coming from $L_1$ cannot be more than 0.6 because 0.6 has already been seen, and the scores from FTS are returned in order of scores. Accordingly, none of the remaining scores can be more than 0.6. Similarly, for $L_2$ the maximum is 0.5. The overall score is the current aggregate score plus the upper bounds for the remaining contribution. Hence, the computation is 2.0+0.6+0.5=3.1, as shown.

At reference numeral 940, a determination is made as to whether a stopping condition has been met. The method can stop when there are at least K objects in SeenTOs whose lower bound scores are higher than the upper bound score of any unseen target object. This guarantees that no unseen object can qualify for the final top K. That is, SeenTOs is guaranteed to contain the final top K target objects. Let Unseen UB denote the upper bound score of any unseen target object. Using the same logic as t.ub the computation is: UnseenUB=$F_{comb}$($F_{agg}$($x_i$, $x_i$ . . . , B times), . . . , $F_{agg}$($x_N$, $x_N$. . . , B times)). Let LB and UB denote the list of all target objects in SeenTOs sorted in decreasing order of their lower and upper bounds, respectively, and let $LB_j$($UB_j$) denote the $j^{th}$ largest lb (ub) value in LB(UB). The stopping condition is: $LB_k \geq$ Unseen UB. If the stopping condition is not meet, the method proceeds back to reference numeral 910 where more documents are acquired. Otherwise, the method continues at 960.

At reference numeral 950, candidates among seen target objects are identified. Here, objects from SeenTOs, which cannot be in the final top K can be filtered out. Consider an object in SeenTOs whose upper bound is less than the lower bounds of at least K target objects. This object cannot be in the final top K and hence can be filtered out. Let Top(List, X) denote the top X elements in the list. The set of candidates is defined by Top(UB, h) where h is the least value which satisfies (i) $LB_k \geq UB_{h=1}$ and (ii) Top(LB, K)$\subseteq$ Top(UB, h). To ensure Top(LB, K)$\subseteq$ Top(UB, h), objects in LB and UB can be ordered as follows. For any two objects O and O', if their lower bound scores (upper bound scores) are equal, they can be ordered in LB(UB) in decreasing order of their upper bound score (lower bound score). If both their upper and lower bound score are the same, they can be ranked base on their TOId.

It is assumed that the SeenTOs table fits in memory. However, if SeenTOs becomes too large, a disk resident hash table or the like may need to be employed.

With the above ordering rule, if $LB_k \geq UB_h$, then the final top K objects are within the top h objects of UB. Consider the OF query whose complete ranked lists and relationships table R is shown in FIG. 11a. Let $F_{agg}$=SUM, $F_{comb}$=SUM, B=2, Ci (chunk size)=1 and K=3. During the first iteration, assume (d1, 1.0) is received for $L_1$ and (d2, 1.0) is received from $L_2$. These documents can be looked up in the relationships table R to obtain (t1, 1.0) and (t2, 1.0) for $L_1$; (t1, 1.0) for $L_2$. At this stage, $x_1$=1.0 and $x_2$=1.0; the bounds of the target objects seen so far (sorted by lower bound) are shown in FIG. 11b.

Also, Unseen UB=$F_{comb}$($F_{agg}$(1.0, 1.0), $F_{agg}$(1.0, 1.0))=4.0. $LB_3$=0 (because there are only two target objects in LB list), $LB_3$ not$\geq$Unseen UB, those more documents need to be retrieved. Assume the following documents are retrieved: (d3, 0.6) from $L_1$ and (d3, 0.5) from $L_2$. The new join result is (t3, 0.6) and (t4, 0.6) for $L_1$; and (t3, 0.5) and (t4, 0.5) for $L_2$. When the bounds for the target objects seen so far are computed, the stop condition still does not hold. Accordingly, more documents are retrieved such as (d4, 0.2) from $L_1$ and (d4, 0.3) from $L_2$. A relationship join results in (t3, 0.2) and (t5, 0.2) for $L_1$; (t3, 0.3) and (t5, 0.3) for $L_2$. At this point, $x_1$=0.2 and $x_2$=0.3; the bounds of the target objects seen so far (sorted by lower bound) are shown in FIG. 11c. UnseenUB=$F_{comb}$($F_{agg}$(0.2, 0.2), $F_{agg}$(0.3, 0.3))=1.0. $LB_3$=1.1$\geq$UnseenUB, so the stopping condition is checked. h turns out to be 4, the candidate set is Top(UB, 4)={t1, t2, t3, t4}.

The method for the generate-only approach is identical to the candidate generation method presented above except that the stopping condition is $LB_K \geq UB_{K+1}$ and Top(LB, K)=Top (LB, K) rather than $LB_K$ not$\geq$Unseen UB. That is, the method halts when the K target objects with the highest lower bound scores have lower bound scores greater than or equal to the upper bound score of any target object outside those K target objects; these are guaranteed to be the final K target objects. Thus, top K objects in UB list is the final top K if and only if $LB_K \geq UB_{K+1}$ and Top(LB, K)=Top(LB, K).

The bound B on the number of documents in a list $L_i$ that can contribute to the score of a target object may be computed in one of the following ways: using properties of aggregation functions, data characteristics and materialized statistics.

As per using properties of aggregation functions, consider the example where $F_{agg}$ is max. Then, B=1. Another bounded aggregation function is sum_top_D. Recall that sum_top_D computes the aggregate score of a target object t for list Li by summing of the DocScores of the top D documents in $L_i$ related to t. In this case, B=D. Sum and Count are examples of aggregation functions where B is unbounded.

In many real scenarios, each target is related to a bounded number of documents. For example, in an entity finder application, it might be known that an entity can appear in at most M documents or, in an expert finder application, an author has written at most M papers. This bounds the number of documents related to a target object t than can occur in $L_i$ (referred to as the frequency of T in $L_i$); so B=M. In cases where both aggregation function and data are bounded, B is simply the minimum of the two as shown in Table 1 below:

TABLE 1

|  | $F_{agg}$ = Max | $F_{agg}$ = sum_top_D | $F_{agg}$ unbounded |
| --- | --- | --- | --- |
| M bounded | B = 1 | B = min(D, M) | B = M |
| M unbounded | B = 1 | B = D | B unbounded |

Figure 12:
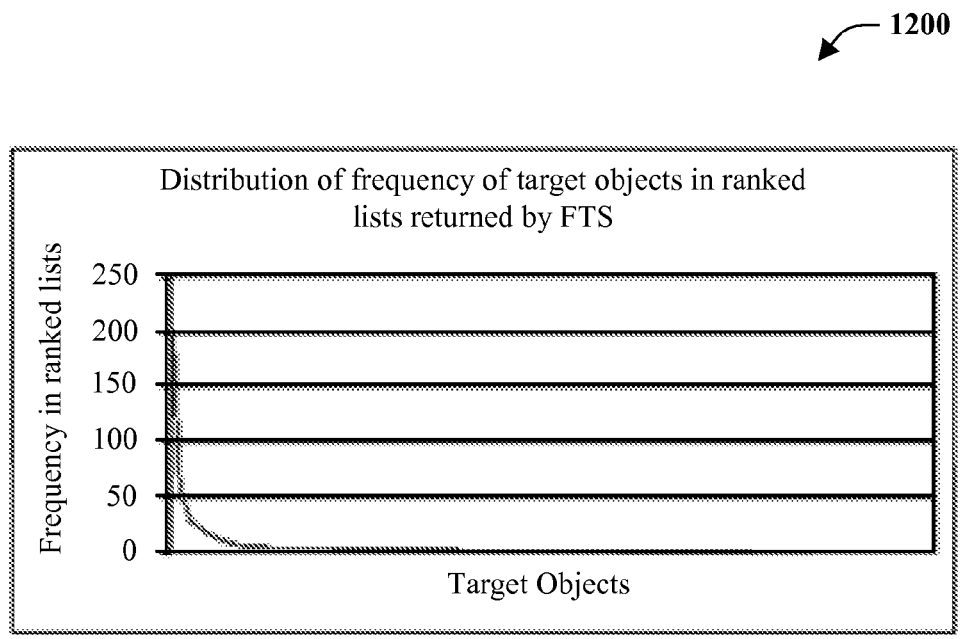
FIG. 12 is a graph of a frequency distribution of target objects.

Turning to materialized statistics, in many real scenarios, only a few target objects have frequency M or close to M. The majority of the target objects have much lower frequency. A typical distribution of frequency of target objects in the ranked lists for single keyword queries is shown in FIG. 12.

While M is about 200 in the above example, more than 99% of the target objects have frequency less than 80. Provided is an optimization, referred to as frequent target object materialization (FTM), to obtain a tight bound on B. The frequency of a target object is the number of documents it is related to. For each keyword w, we materialize the target objects with frequency above a threshold θ in the ranked list returned by FTS for the single keyword query {w}. Their TOIds can be stored along with their final aggregated score for w. (For uncommon keywords, i.e., keywords contained in very few documents, there are typically no frequent target objects, so nothing needs to be stored). For any keyword w, it is known that the target objects not found in the materialized set for w have frequency less than or equal to θ. Hence, the bound B for such target objects is B=min(d, M, θ). The value of the cardinality bound B is used in the candidate generation algorithm as explained earlier. The materialized (exact) scores are used as the lower and upper bound scores for these objects. During the process, the bounds for these materialized objects need not be updated. Note that the FTM optimization has two-fold benefit: (1) the exact scores of the materialized target objects (t.lb[i]=t.ub[i]=materialized score) are obtained and (2) there are better bounds for the remaining target objects. Both these factors lead to earlier termination of the algorithm. The choice of θ offers a tradeoff between efficiency of candidate generation and space overhead; lower values of θ imply faster termination but higher space overhead and vice-versa.

The goal of pruning to the final top K is to isolate the exact top K target objects from the superset of candidates identified in the generation phase. It is submitted that it is sufficient to compute the exact scores of a subset of the candidate target objects and then stop. In one implementation, computing the exact score of a target object entails queries against relationships table R and accessing (DocId, DocScore) pairs in the lists returned by FTS. The challenge is to compute the exact scores of as few candidates as possible and still return the top K objects with exact scores. Presented hereinafter is a method of computing the score for the smallest possible number of candidate target objects. In some applications, it is sufficient to return the top K target objects even if their scores are not exact. In such scenarios, the method can be improved even further.

When the exact score of the $K^{th}$ best target object is greater than or equal to the upper bound scores of any candidate target object whose score is not yet computed, the current best K target objects are the overall best K objects. It can be shown that the best pruning strategy (i.e., the one that computes the exact scores of least number of target objects) is to iteratively sort the candidate target objects in the decreasing order of their upper bound scores and compute exact scores in that order until a stopping condition is met.

Referring to FIG. 13, a method of pruning to the final top K is illustrated in accordance with an aspect of the subject innovation. At reference numeral 1310, all candidate target objects are labeled as "un-computed." At 1320, the candidate target objects are sorted in the decreasing order of their upper bound scores using lower bound scores to break ties. A determination is made at 1330 as to whether the top K target objects in the upper bound have exact scores computed. If yes, the method proceeds to 1340, where these top K objects are returned and the method terminates. In this case, resources are saved on computing exact scores of the remaining candidates. This is correct, because all other candidates have upper bounds less than these exact scores and hence cannot be better than them. If at 1340 the determination is no, then at 1350 the exact scores of all "un-computed" target objects in upper bound with the K best upper bounds are computed. Their upper bound scores are updated (e.g., replaced with exact scores) and marked as "computed." The method then continues at reference numeral 1320, where the candidate objects are sorted and the method iterates until all target objects in the top K are upper bounds are computed.

To compute the exact score of a candidate t, the set Dt of documents related to t should be acquired by looking up in R. Subsequently, obtain the DocScore of each document in Dt in each list $L_i$ can be obtained and employed to compute the exact score utilizing one of the previously described methods. Since conventional FTS systems do not usually provide random access to documents in the ranked lists, all document identifiers with scores from each $L_i$ can be retrieved using sorted access, and the identifiers can be stored in a hash table or a temporary relation (e.g., depending on the size) keyed on DocId to provide that random access. However, unlike in the candidate generation phase, these additional documents retrieved need not be joined with R.

Continuing with the most recent example (FIG. 11a-c), the candidate set is {t1, t2, t3, t4}. The exact scores pruning method 1300 will retrieve all the remaining documents from each $L_i$ shown in FIG. 11(a). After sorting by upper bound scores, UB={t1, t2, t3, t4} with upper bound scores 2.5, 1.8, 1.6, and 1.6 (FIG. 11c), respectively (tie between t3 and t4 broken based on their lower bound scores). Since K=3, the method computes the exact scores of the top 3 objects in UB, i.e., t1, t2 and t3. Their exact scores evaluate to 2.2, 1.6, and 1.6, respectively. The method 1300 then proceeds back to 1320. The top K objects in UB are again {t1, t2, t3} and their exact scores are already computed. Hence, the final top K results are {t1, t2, t3}.

Pruning exact scores computes the exact scores of the minimum possible number of candidates. The intuition is that no exact pruning strategy can isolate the final top K objects without computing the exact scores of the candidates that are in the top K in UB at any stage of the algorithm. Accordingly, given a set of candidate target objects with correct upper and lower bound scores, no exact scores pruning strategy can isolate the final top K with fewer exact score computations than method 1300.

In some applications, it might be sufficient to return the top K target objects even if their scores are not exact. In such cases, it can be more efficient to compute the exact scores of fewer candidates. For example, consider the candidate t1 in the example associated with FIG. 11a-c. Since its lower bound score (2.0) is greater than the $(K+1)^{th}$ highest upper bound score (1.4), it is guaranteed to be in the final top K. Hence, its exact score need not be computed. Note that it was not possible to avoid such exact score computations in method 1300 because their exact scores were desired. Here, the set of candidates whose score must be computed to isolate the final top K target objects is first identified. These are classified into crossing and boundary candidates. A target object is crossing if its rank in LB is more than K, and its rank in UB list is K or less. A pair of target objects (A, B) are called boundary objects if the exact scores of neither A nor B has been computed, and before their exact score computation:
1) The top K objects in UB and LB are same (i.e., there are no crossing objects);
2) A is the $K^{th}$ object in LB list and $u^{th}$ object in UB list (u≦K);
3) B is the $(K+1)^{th}$ object in UB and $l^{th}$ object in LB list $1≧(K+1)$; and
4) $LB_K < UB_{K+1}$.

It is sufficient to iteratively compute the exact scores of the crossing and boundary objects (first A and then, if necessary, B) until these sets are empty for identifying the top K target objects. The intuition is as follows: Recall from the example with respect to FIG. 11a-c, the necessary and sufficient condition for identifying the final top K is $LB_K \geq UB_{K+1}$ and Top(LB, K)=Top(UB, K). Note that this condition is not satisfied if there are crossing objects or boundary object pairs. Computing exact scores of non-crossing objects cannot change the status of a crossing object t because it can only lower the rank of other objects in UB list (i.e., can only raise t's rank in UB list) and raise the rank of other objects in LB list (i.e., can only lower t's rank in LB list). Only computing the exact score of t can change its status; hence exact scores of crossing objects should be computed for the stopping condition to hold. Similarly, computing exact scores of non-boundary objects can only raise the ranks of boundary objects in UB list and lower their ranks in LB list. Accordingly, either they can stay as boundary objects or at least one of them becomes crossing (in which case we should compute its exact score).

A method or implementing mechanism can be more efficient by updating the bounds of crossing and boundary candidates based on the documents retrieved so far and checking the stopping condition instead of computing their exact scores right away. Thus, just enough additional documents can be retrieved from the lists $L_i$ necessary to satisfy the stopping condition (instead of retrieving all of them as in pruning exact scores method 1300), thereby saving FTS costs.

In the following section, discussed are several significant issues. In particular, described are: the handling of selection predicates, the choice of aggregation functions, and the application to other types of ranked search.

Turning first to the handling of selection predicates, it is assumed that the ranked lists $L_i$ of documents contain only the objects that satisfy the selection condition: either by pushing the selection to FTS (if it supports) or by filtering the documents returned by FTS. The basic flow of algorithms remains unchanged. The bound computation, however, may have to be modified when frequency target materialization (FTM) is used. Note that for the materialized target objects, materialized exact scores should not be utilized as the lower bound scores, so the lower bound score is initialized to 0 and updated during candidate generation like the non-materialized target objects. Aspects of the innovation can use their materialized scores as upper bound scores but they could be weaker because of the presence of selection predicates. Therefore, their upper bound scores can also be determined during candidate generation like the non-materialized objects and use the less of the two. Note that the bound θ becomes weak because the actual frequencies in the ranked list are lower due to the selection. This may result in weaker upper bound scores for very selective conditions.

For selection predicates on target objects, an additional filter can be applied at the candidate generation step. Alternatively, the additional filter could be applied while joining the ranked list of documents with the relationships table R, for example. However, that can force a join with the target objects table T as well.

As per the choice of an aggregation function, the materialized scores for frequent target objects may be useful even if $F_{agg}$ specified at query time is different from that used for materialization.

If scores are materialized using the SUM aggregation function, the materialized scores can be used as the upper bound scores for the class of SUM_TOP_D functions.

If the frequencies of the frequent target objects in the corresponding ranked list, for each keyword, are materialized, these frequencies (for bounding the B value) can be used to compute the upper bounds for the materialized objects for any subset monotonic aggregation function.

The techniques, mechanisms and methods disclosed herein apply beyond keyword search paradigms involving FTS, and both the provided scoring functions and evaluation techniques apply to other types of ranked searches including but not limited to multimedia search and ranked search on structured attributes. By way of example, the search objects can be homes where each home has price and neighborhood information associated with it. Suppose there is a ranking subsystem that supports ranked search on price, i.e., returns the ranked list of homes that best match a given price. An application might want to find the top neighborhoods that have homes with price similar to $350K. Such queries can be answered using the disclosed techniques. FTS is substituted with the appropriate ranking subsystem, which generates the ranked lists. The provided innovative techniques can subsequently be employed therewith.

As used herein, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g. hard disk, floppy disk, magnetic strips . . . ), optical disks (e.g., compact disk (CD), digital versatile disk (DVD). . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 14:
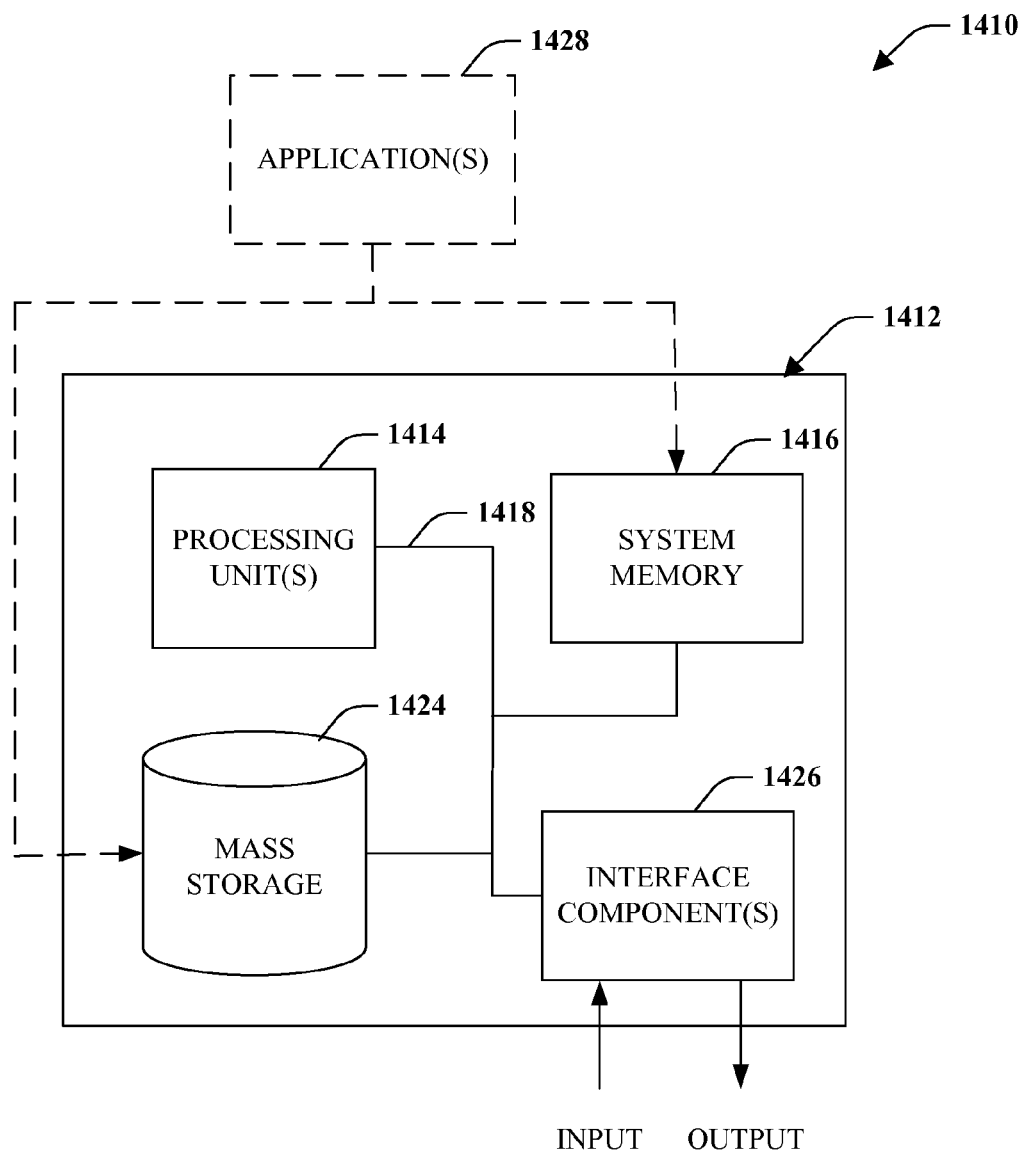
FIG. 14 is a schematic block diagram illustrating a suitable operating environment for aspects of the subject innovation.
Figure 15:
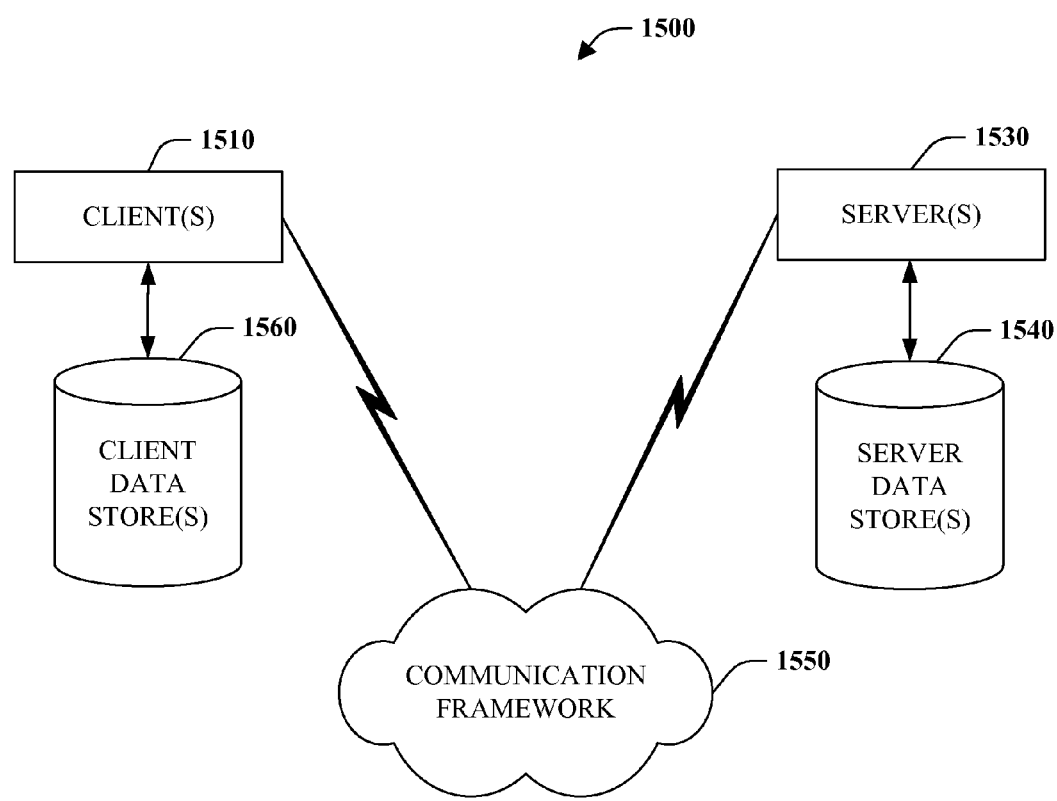
FIG. 15 is a schematic block diagram of a sample-computing environment.

In order to provide a context for the various aspects of the disclosed subject matter, FIGS. 14 and 15 as well as the following discussion are intended to provide a brief, general description of a suitable environment in which the various aspects of the disclosed subject matter may be implemented.

While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 14, an exemplary environment 1410 for implementing various aspects disclosed herein includes a computer 1412 (e.g., desktop, laptop, server, hand held, programmable consumer or industrial electronics . . . ). The computer 1412 includes a processing unit 1414, a system memory 1416, and a system bus 1418. The system bus 1418 couples system components including, but not limited to, the system memory 1416 to the processing unit 1414. The processing unit 1414 can be any of various available microprocessors. It is to be appreciated that dual microprocessors, multi-core and other multiprocessor architectures can be employed as the processing unit 1414.

The system memory 1416 includes volatile and nonvolatile memory. The basic input/output system (BIOS), containing the basic routines to transfer information between elements within the computer 1412, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1412 also includes removable/non-removable, volatile/non-volatile computer storage media. FIG. 14 illustrates, for example, mass storage 1424. Mass storage 1424 includes, but is not limited to, devices like a magnetic or optical disk drive, floppy disk drive, flash memory or memory stick. In addition, mass storage 1424 can include storage media separately or in combination with other storage media.

FIG. 14 provides software application(s) 1428 that act as an intermediary between users and/or other computers and the basic computer resources described in suitable operating environment 1410. Such software application(s) 1428 include one or both of system and application software. System software can include an operating system, which can be stored on mass storage 1424, that acts to control and allocate resources of the computer system 1412. Application software takes advantage of the management of resources by system software through program modules and data stored on either or both of system memory 1416 and mass storage 1424.

The computer 1412 also includes one or more interface components 1426 that are communicatively coupled to the bus 1418 and facilitate interaction with the computer 1412. By way of example, the interface component 1426 can be a port (e.g., serial, parallel, PCMCIA, USB, FireWire . . . ) or an interface card (e.g., sound, video, network . . . ) or the like. The interface component 1426 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1412 to output device(s) via interface component 1426. Output devices can include displays (e.g. CRT, LCD, plasma . . . ), speakers, printers and other computers, among other things.

FIG. 15 is a schematic block diagram of a sample-computing environment 1500 with which the subject innovation can interact. The system 1500 includes one or more client(s) 1510. The client(s) 1510 can be hardware and/or software (e.g., threads, processes, computing devices). The system 1500 also includes one or more server(s) 1530. Thus, system 1500 can correspond to a two-tier client server model or a multi-tier model (e.g., client, middle tier server, data server), amongst other models. The server(s) 1530 can also be hardware and/or software (e.g., threads, processes, computing devices). The servers 1530 can house threads to perform transformations by employing the subject innovation, for example. One possible communication between a client 1510 and a server 1530 may be in the form of a data packet transmitted between two or more computer processes.

The system 1500 includes a communication framework 1550 that can be employed to facilitate communications between the client(s) 1510 and the server(s) 1530. The client(s) 1510 are operatively connected to one or more client data store(s) 1560 that can be employed to store information local to the client(s) 1510. Similarly, the server(s) 1530 are operatively connected to one or more server data store(s) 1540 that can be employed to store information local to the servers 1530.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A query processor system comprising a processor for executing the following components:

a receiver component that receives an object finder query;

an evaluation component that identifies target objects that best match one or more query keywords by employing search object identities and associated aggregate scores and relationship information including attributes of search objects;

an extraction component that retrieves the search objects and extracts structured information from the search objects, and populates one or more target object tables with the extracted structured information;

a component that evaluates keywords with respect to the search objects and returns a ranked list of matching search objects, such that all documents containing a set of query keywords is retrieved and joined with a relations table to find all related target objects;

a score component that computes a relevancy score for each identified target object based on aggregation of scores associated with matching search objects, search objects are retrieved in decreasing order of their aggregate scores and upper and lower bound scores computed and maintained for related target objects, aggregate scores are computed by aggregating the relevancy scores for all target objects and returning top target objects to a user, wherein an individual score for a target object is computed by:

computing one or more row marginals of a score matrix to obtain an overall score =(Score(t)), wherein $Score(t)=F_{agg}d \in D_t(F_{comb}DocScore(d, L_1)), \ldots, (DocScore(d, L_N)))$, wherein $DocScore(d, L_j)$ denotes the DocScore of the document $d \in D_t$ in a list $L_j$, $F_{comb}$=MIN, and $F_{agg}$=Sum applied to the score matrix; or computing one or more column marginals of a score matrix to obtain an overall score=(Score(t)), wherein $Score(t)=F_{comb}(F_{agg}d \in D_t(DocScore(d, L_1)), \ldots, (F_{agg}d \in D_t(DocScore(d,L_N));$ and a filter component that returns a specified number of top target objects based on a score associated with the target object, the top target objects are identified by the filter component wherein only a subset of search objects that match with keywords are selected and their exact scores computed in order to isolate the top target objects.

2. The system of claim 1, further comprising a component that identifies target objects that correspond to matching search objects.

3. The system of claim 1, the evaluation component identifies matching target objects from a pseudo-search object that is composed of all search objects related to individual target objects.

4. A system that facilitates processing of objects finder queries comprising:

a processor;

a computer-implemented means for receiving an object finder query;

a computer-implemented means for returning a specified number of target objects that best match a set of one or more of query keywords in documents related to the target objects;

a computer-implemented means for evaluating keywords with respect to search objects and returning a ranked list of matching search objects, such that all documents containing a set of query keywords is retrieved and joined with a relations table to find all related target objects;

a computer-implemented means for computing a relevancy score for each identified target object based on aggregation of scores associated with matching search objects, aggregate scores are computed by aggregating relevancy scores for all target objects and returning top target objects to a user, wherein an individual score for a target object is computed by:

computing one or more row marginals of a score matrix to obtain an overall score (Score(t)), wherein $Score(t)=F_{agg}d \in D_t(F_{comb}DocScore(d, L_1)), \ldots, (DocScore(d,L_N)))$, wherein $DocScore(d, L_j)$ denotes the DocScore of the document $d \in D_t$ in a list $L_j$, $F_{comb}$=MIN, and $F_{agg}$=Sum applied to the score matrix; or computing one or more column marginals of a score matrix to obtain an overall score (Score(t)), wherein $Score(t)=F_{comb}(F_{agg}d \in D_t(DocScore(d, L_1)), \ldots, (F_{agg}d \in D_t(DocScore(d,L_N));$ and a computer-implemented means for returning a specified number of top target objects based on the score associated with the target object, wherein only a subset of search objects that match with keywords are selected and their exact scores computed in order to isolate top target objects.

5. A method of object finder query evaluation comprising the following computer-implemented acts:

employing a processor to execute computer executable instructions stored on a computer readable medium to perform the following acts:

identifying target objects based on search object identities and associated aggregate scores and relationship information including attributes of search objects, wherein an individual score for a target object is computed by:

computing one or more row marginals of a score matrix to obtain an overall score (Score(t)), wherein $Score(t)=F_{agg}d \in D_t(F_{comb}DocScore(d, L_1)), \ldots, (DocScore(d,L_N)))$, wherein $DocScore(d, L_j)$ denotes the DocScore of the document $d \in D_t$ in a list $L_j$, $F_{comb}$=MIN, and $F_{agg}$=Sum applied to the score matrix; or computing one or more column marginals of a score matrix to obtain an overall score (Score(t)), wherein $Score(t)=F_{comb}(F_{agg}d \in D_t(DocScore(d, L_1)), \ldots, (F_{agg}d \in D_t(DocScore(d,L_N)));$ fetching a ranked list of at least a subset of keyword matching documents;

generating a superset of top target objects from the keyword matching documents;

checking a stopping condition indicative of whether the top target objects have been identified;

returning the top target objects if the stopping condition is satisfied, otherwise reiterating through the acts until the stopping condition is satisfied;

generating a superset of target objects comprising incrementally updating a seen target object table; and incrementally updating the seen target object table comprising computing upper and lower bound scores for target object relevancy for each target object based on seen target object scores and a cardinality bound identifying a maximum number of document in any ranked list that can contribute to a relevancy score of any target object.

6. The method of claim 5, incrementally updating the seen target object table comprising:

joining the fetched ranked list of documents for each keyword with a document, target object relation table;

incrementally performing a group by for a joined data set of each keyword; and incrementally combining the joined data set associated with each keyword.

7. The method of claim 6, the stopping condition is satisfied when there are at least K target objects in the seen target object table whose lower bound scores are greater than the upper bound score of any unseen target object, guaranteeing than no unseen target object will qualify for a top K, wherein K is a specified number of top matches.

8. The method of claim 6, the stopping condition is satisfied when there are at least K target objects in the seen target object table whose lower bound scores are greater than the upper bound score of any unseen target object, guaranteeing that no unseen target object will qualify for a top K, wherein K is a specified number of top matches.

9. The method of claim 8, further comprising computing exact relevance scores for as few target objects as possible while still returning the top K.

10. The method of claim 9, computing the exact relevance scores for as few candidates as possible comprising:
    sorting the target objects in decreasing order by their upper bound scores; and
    returning target objects, if all top target objects relevance scores are computed.

11. The method of claim 10, further comprising:
    computing the relevance score of all un-computed target objects within the top K in upper bound; and
    updating the upper and lower bound scores with the computed relevance score.

12. The method of claim 6, further comprising:
    sorting target objects by their lower bound and upper bound scores into sorted lower bound (LB) and upper bound (UB) lists;
    returning the top target objects in UB if $LB_K \geq UB_{K+1}$.

13. The method of claim 12, further comprising:
    computing the relevancy score for at least one un-computed boundary or crossing object; and
    updating the lower and upper bound scores for the at least one boundary or crossing object with the computed relevancy score.

14. The method of claim 12, further comprising:
    computing the relevancy score for an un-computed target object from at least one of the sorted lists; and
    updating the upper and lower bound scores with the computed relevancy score.

* * * * *